United States Patent
Hiraguchi

(10) Patent No.: US 7,404,528 B2
(45) Date of Patent: *Jul. 29, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 485 days.

This patent is subject to a terminal disclaimer.

(21) Appl. No.: 11/064,099

(22) Filed: Feb. 24, 2005

(65) Prior Publication Data

US 2005/0184181 A1 Aug. 25, 2005

(30) Foreign Application Priority Data

Feb. 24, 2004 (JP) ............................. 2004-048567

(51) Int. Cl.
*G11B 23/107* (2006.01)

(52) U.S. Cl. .................................... 242/338.1; 242/348

(58) Field of Classification Search ............. 242/338.1, 242/338.3, 343, 343.1, 343.2, 348, 348.1, 242/348.2, 348.3, 348.4, 355; 360/132

See application file for complete search history.

(56) References Cited

U.S. PATENT DOCUMENTS

| | | | |
|---|---|---|---|
| 3,920,196 A | 11/1975 | Tucker et al. | |
| 4,014,042 A | 3/1977 | Schoettle et al. | |
| 4,033,523 A | 7/1977 | Roman | |
| 4,210,296 A | 7/1980 | Frechette | |
| 4,742,415 A | 5/1988 | Oishi | |
| 5,435,498 A | 7/1995 | Makino | |
| 5,436,782 A * | 7/1995 | Sieben | 360/132 |
| 5,547,142 A | 8/1996 | Cheatham et al. | |
| 5,813,622 A | 9/1998 | Von Alten | |

(Continued)

FOREIGN PATENT DOCUMENTS

EP 0 347 947 A2 12/1989

(Continued)

*Primary Examiner*—Peter M. Cuomo
*Assistant Examiner*—Scott Haugland
(74) *Attorney, Agent, or Firm*—Sughrue Mion, PLLC

(57) ABSTRACT

A recording tape cartridge includes: a case accommodating a reel on which a recording tape is wound; a brake member provided non-rotatably with respect to the case; a lock member provided in a mounting portion on the inner surface of a top plate of the case to be slidable in a radial direction of the reel; and a falling-out preventing member for keeping the lock member from being removed from the mounting portion. The brake member is arranged to selectively assume a rotation locking position where the brake member is engaged with the reel to prevent the reel from being rotated and a rotation permitting position where the brake member is disengaged from the reel to permit the reel to be rotated. The lock member is arranged, when the brake member assumes the rotation locking position, to be interposed between the upper surface of the reel and a top plate of the case, thereby preventing the reel from being moved axially thereof. The lock member is also arranged, when the brake member is moved from the rotation locking position to the rotation permitting position, to be removed from between the upper surface of the reel and the top plate of the case in response to the movement of the brake member, thereby permitting the reel to be moved axially thereof. When the brake member assumes the rotation locking position, a clearance is defined between the lock member and the brake member, and the clearance is made smaller than the movement stroke of the brake member from the rotation locking position to the rotation permitting position.

20 Claims, 18 Drawing Sheets

U.S. PATENT DOCUMENTS

| | | | |
|---|---|---|---|
| 5,901,916 A | 5/1999 | McAllister et al. | |
| 6,038,112 A * | 3/2000 | Kletzl | 360/132 |
| 6,234,416 B1 | 5/2001 | Nayak | |
| 6,318,657 B1 | 11/2001 | Nayak | |
| 6,452,747 B1 | 9/2002 | Johnson et al. | |
| 6,572,045 B2 | 6/2003 | Blair et al. | |
| 6,581,866 B2 | 6/2003 | Tsuyuki et al. | |
| 7,040,564 B1 | 5/2006 | Veno et al. | |
| 7,104,486 B2 | 9/2006 | Hiraguchi | |
| 7,159,815 B2 | 1/2007 | Alexander et al. | |
| 2001/0026030 A1 * | 10/2001 | Morita et al. | 264/318 |
| 2002/0141087 A1 | 10/2002 | Hiraguchi et al | |
| 2003/0142441 A1 * | 7/2003 | Morita et al. | 360/132 |
| 2004/0026550 A1 * | 2/2004 | Hiraguchi et al. | 242/338.1 |
| 2005/0023400 A1 | 2/2005 | Hiraguchi | |
| 2005/0184179 A1 | 8/2005 | Hiraguchi | |
| 2005/0184180 A1 | 8/2005 | Hiraguchi | |
| 2005/0184182 A1 | 8/2005 | Hiraguchi | |
| 2005/0211813 A1 | 9/2005 | Hiraguchi | |

FOREIGN PATENT DOCUMENTS

| | | |
|---|---|---|
| EP | 0 488 387 A1 | 6/1992 |
| EP | 1 098 321 A1 | 5/2001 |
| EP | 1 569 229 A2 | 8/2005 |
| EP | 1 569 232 A2 | 8/2005 |
| JP | 1-139833 A | 6/1989 |
| JP | 5-258524 A | 10/1993 |
| JP | 7-161166 A | 6/1995 |
| JP | 11-39833 A | 2/1999 |
| WO | WO 98/44506 A2 | 10/1998 |

* cited by examiner

F I G. 1
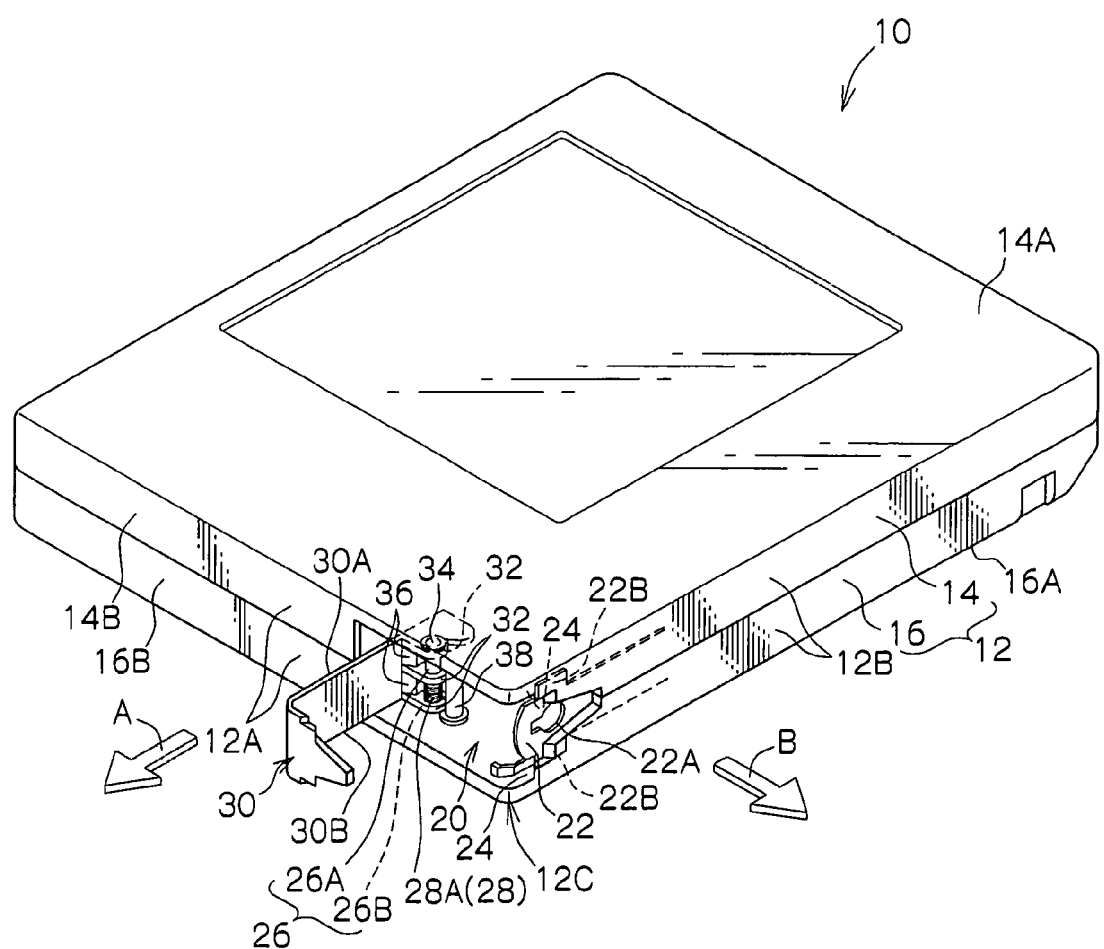

RECORDING TAPE CARTRIDGE

CROSS-REFERENCE TO RELATED APPLICATION

This application claims priority under 35 USC 119 from Japanese Patent Application No. 2004-48567, the disclosure of which is incorporated by reference herein.

BACKGROUND OF THE INVENTION

1. Field of the Invention

The present invention relates to a recording tape cartridge. More particularly, the present invention pertains to a recording tape cartridge in which a single reel on which is wound a recording tape such as a magnetic tape usable as a recording and reproducing medium for a computer or the like is accommodated in a case.

2. Description of the Related Art

There has heretofore been known a recording tape cartridge in which a recording tape such as a magnetic tape usable as a recording and reproducing medium for a computer or the like is wound on a reel, and the reel is rotatably accommodated in a case formed from a plastic material. The recording tape cartridge is arranged such that when in use (when loaded into a drive device), the reel is rotatable in the case, while when in non-use, the reel is locked so as to be non-rotatable in the case.

More specifically, the recording tape cartridge includes brake means for preventing the reel from being rotated within the case when the cartridge is in non-use. The brake means may be constructed such that a brake member, which for example is non-rotatable with respect to the case, can be engaged with the reel.

As shown in FIG. 8, for example, a brake member 130 is configured in the form of a disk which is disposed in such a manner as to be vertically movable within a bottomed, generally cylindrical shape reel hub 112 of a reel 110. A pair of engagement projections 134 which define a U shape as seen in a plan view are provided upright on the upper surface of the brake member 130. A pair of rotation regulating ribs 126 depending from the inner surface of an upper case half 122 are inserted inside the engagement projections 134, thereby making the brake member non-rotatable with respect to the case.

Further, the brake member 130 is normally biased toward a bottom wall 114 of the reel hub 112 with the aid of a biasing member such as compression coil spring 116, so that an annular brake gear 132 formed in the lower surface of the brake member 130 is meshed with an annular engagement gear 118 formed in the upper surface of the bottom wall 114 of the reel hub 112. In this manner, the reel 110 is prevented from inadvertent rotation.

Still further, a generally cylindrical operation projection 136, which is projectingly provided at an axial center portion of the brake member 130, is inserted in a through hole 114A formed in an axial center portion of the bottom wall 114 of the reel hub 112, and exposed through a gear opening 128 formed substantially at a center portion of a lower case half 124. In an attempt to make the reel 110 rotatable, the operation projection 136 (brake member 130) is pushed upward, and as a result the brake gear 132 is disposed out of engagement with the engagement gear 118 (refer to U.S. Pat. No. 6,452,747, for example).

However, with the above-described arrangement, since the reel 110 is movable upward (movable axially of the reel 110) against a biasing force of the biasing member such as compression coil spring 116, it is likely that in case the bottom wall 114 of the reel hub 112 is moved upward because of the recording tape cartridge being impacted due to dropping or the like, the brake member 130 becomes tilted and jammed at the edge of the through hole 114A while being in a tilted orientation (being on the point of falling) as shown in the drawing.

If the recording tape cartridge is loaded into a drive device under such a condition, there tends to arise a problem that not only the recording/reproducing operation cannot be performed but also the recording tape cartridge is damaged or the drive device malfunctions. Another problem is that since the reel becomes rotatable when in non-use, the recording tape tend to get wrinkled or torn off.

SUMMARY OF THE INVENTION

Accordingly, it is an object of the present invention to provide a recording tape cartridge which is constructed such that when in non-use, a reel can not be released from being the rotation-locked state by a brake member.

According to a first aspect of the present invention, there is provided a recording tape cartridge, comprising: a case for accommodating a reel on which a recording tape is wound; a brake member provided non-rotatably with respect to the case, the brake member being capable of being moved to selectively assume a rotation locking position where the brake member is disposed in engagement with the reel thereby preventing the reel from being rotated and a rotation permitting position where the brake member is disposed out of engagement with the reel thereby permitting the reel to be rotated; an engagement projection provided on the brake member, the engagement projection having a first tapered surface formed at an end thereof; a lock member provided in a mounting portion formed on an inner surface of a top plate of the case, the lock member being slidable radially of the reel, the lock member being arranged, when the brake member assumes the rotation locking position, to be interposed between an upper surface of the reel and the top plate of the case thereby preventing the reel from being moved axially, lock member being also arranged, when the brake member is moved to assume the rotation permitting position, to be removed from between the upper surface of the reel and the top plate of the case in interlocking relationship with the movement for the brake member to assume the rotation permitting position thereby permitting the reel to be moved axially; a cam portion provided on the lock member, the cam portion being engageable with the engagement projection and having a second tapered surface formed at an end thereof; a stabilizing portion provided on the lock member more inward than the cam portion in a radial direction of the reel; a falling-out preventing member for preventing the lock member from falling out from the mounting portion; wherein a clearance between the first tapered surface and the second tapered surface at the rotation locking position in a direction of the movement of the brake member is made shorter than a length of movement stroke of the brake member from the rotation locking position to the rotation permitting position; wherein a reactive force against a torque imparted to the lock member when the first tapered surface contacts the second tapered surface is produced by the stabilizing portion and the fall-out preventing member.

According to a second aspect of the present invention, there is provided A recording tape cartridge, comprising: case for accommodating a reel on which a recording tape is wound on a reel hub including an upper flange and a lower flange; a brake member including an engagement projection having a tapered surface, the brake member being provided non-rotatably with respect to the case, the brake member being capable of being moved to selectively assume a rotation locking position where the brake member is disposed in engagement with the reel thereby preventing the reel from being rotated and a rotation permitting position where the brake member is disposed out of engagement with the reel thereby permitting the reel to be rotated; an engagement projection provided on the brake member, the engagement projection having a first tapered surface formed on an end portion thereof; a lock member including provided in a mounting portion formed on an inner surface of a top plate of the case, the lock member being slidable in a radial direction of the reel, the lock member being arranged, when the brake member assumes the rotation locking position, to be interposed between an upper surface of the reel and the top plate of the case thereby preventing the reel from being moved axially, the lock member being also arranged, when the brake member is moved to assume the rotation permitting position, to be removed from between the upper surface of the reel and the top plate of the case in interlocking relationship with the movement of the brake member to assume the rotation permitting position thereby permitting the reel to be moved axially; a cam portion provided on the lock member, the cam portion being engageable with the engagement projection and having a second tapered surface formed on an end portion thereof; a stabilizing portion provided on the lock member more inward than the cam portion in a radial direction of the reel; a first elastic member provided between the brake member and the mounting portion for permitting the brake member to selectively assume the rotation locking position and the rotation permitting position; a second elastic member provided between the lock member and the mounting portion for permitting the lock member to slide in a radial direction of the reel in response to the movement of the brake member; and a falling-out preventing member for preventing the lock member from being removed from the mounting portion; wherein a clearance between the first tapered surface and the second tapered surface at the rotation locking position in a direction of the movement of the brake member is made shorter than a length of movement stroke of the brake member from the rotation locking position to the rotation permitting position; wherein a thickness of a portion of the lock member which is interposed between an upper surface of the reel and the top plate when the brake member assumes the rotation locking position is made substantially equal to a distance between the upper flange and the top plate; and wherein a reactive force against a torque imparted to the lock member when the first tapered surface contacts the second tapered surface is produced by the stabilizing portion and the fall-out preventing member.

Other objects, features and advantages of the present invention will become apparent from the ensuing description taken in conjunction with the accompanying drawings.

BRIEF DESCRIPTION OF THE DRAWINGS

FIG. 1 is a perspective view showing a recording tape cartridge to which the present invention is applicable;

DETAILED DESCRIPTION OF THE INVENTION

Figure 2:
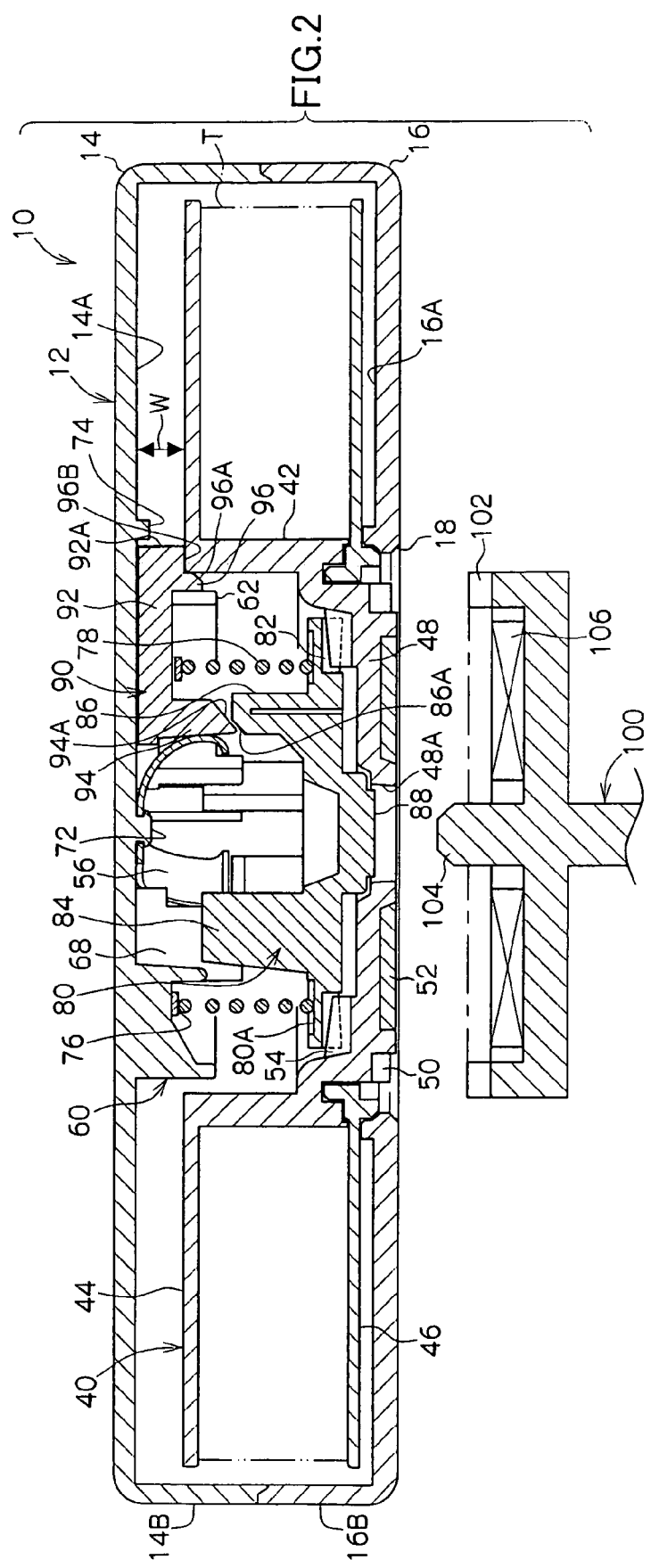
FIG. 2 is a sectional side view showing the recording tape cartridge before a rotary shaft is moved up.

Embodiments of the present invention will now be described with reference to the drawings. For convenience of description, it is assumed that a front direction. This direction is a direction in which the recording tape cartridge is loaded into a drive device is indicated by an arrow A and is regarded as a front direction, and a left direction is indicated by an arrow B, and with these directions as reference, front and rear, left and right, and up and down directions are defined.

Referring to FIG. 1, a recording tape cartridge 10 includes a substantially box-shaped case 12 comprising an upper case half 14 and a lower case half 16 each formed from a plastic material such as POLYCARBONATE. The upper and lower case halves 14 and 16 are jointed together by means of screwing or ultrasonic welding, with a peripheral wall 14B projectingly provided at a peripheral edge of a top plate 14A being disposed in abutment with a peripheral wall 16B projectingly provided at a peripheral edge of a bottom plate 16A.

Figure 3:
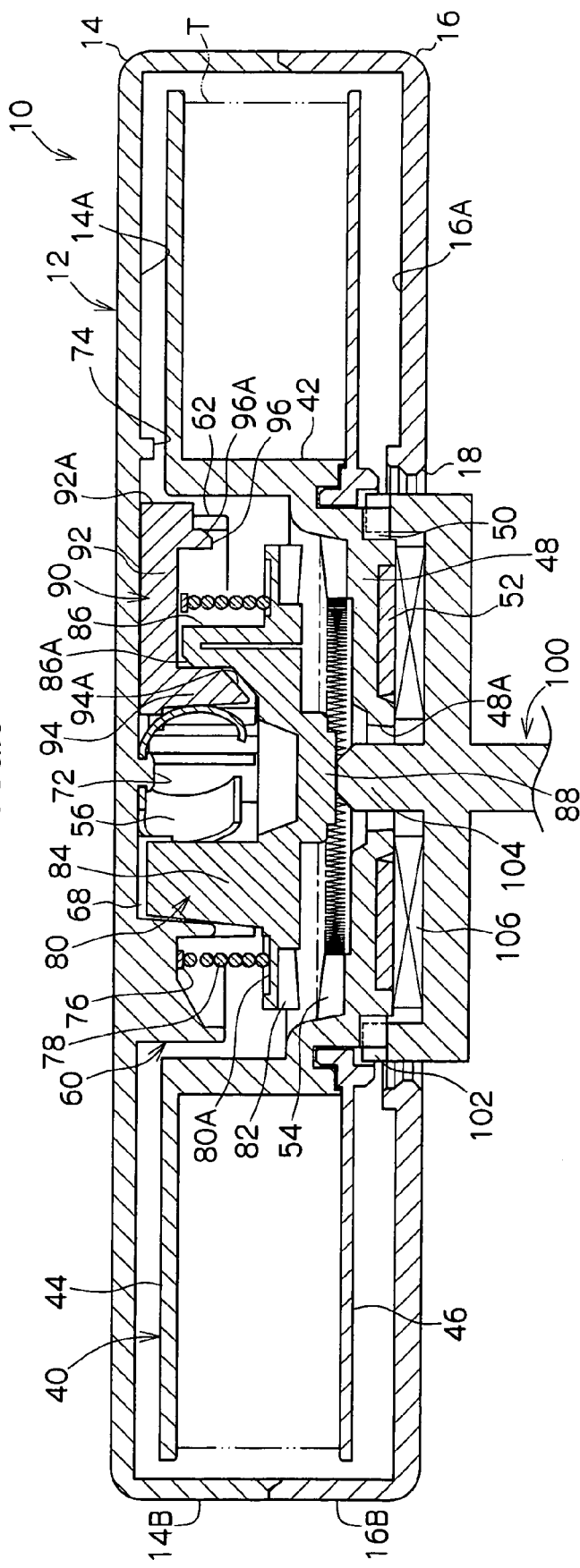
FIG. 3 is a sectional side view showing the recording tape after the rotary shaft has been moved up.

Within the case 12 is rotatably accommodated a single reel 40 which comprises a bottomed cylindrical shape reel hub 42 constituting an axial center portion, an upper flange 44 provided integrally at an upper end of the reel hub 42, and a lower flange 46 ultrasonically-welded to a lower end of the reel hub 42, as shown in FIGS. 2 and 3 A recording tape T such as a magnetic tape serving as an information recording and reproducing medium is wound on the outer peripheral surface of the reel hub 42 in such a manner that the width-wise edges of the wound recording tape T are held by the upper and lower flanges 44 and 46 respectively.

As shown in FIG. 1, an opening 20, through which the recording tape T wound on the reel 40 is drawn, is formed in the recording tape cartridge 10 in the neighborhood of a left front side corner portion 12C thereof. More specifically, the opening 20 is formed extending through a front wall 12A and a left side wall 12B in the neighborhood of the corner portion 12C, and it is arranged so that a leader tape 22 secured to the fore end of the recording tape and placed along the left side wall 12B can drawn out through the opening 20.

The term "corner portion" as used herein refers to a ridge line portion where the front wall 12A and the left side wall 12B intersect substantially at a right angle with each other as seen in a plan view.

The leader tape 22 serves as a drawn-out member which is engaged with a drawing-out member (not shown) of the drive device for the purpose of drawing out the recording tape T. The leader tape 22 has an aperture 22A formed therein near its end, which aperture is adapted to be engaged with the drawing-out member. A pair of vertically extending protrusions 22B are provided on the leader tape 22 in such a manner as to vertically extend from the opposite edges thereof respectively. The leader tape 22 is held within the case by virtue of the protrusions 22B being received (inserted) in recesses 24 formed in the inner surfaces of the upper and lower case halves 14 and 16 respectively.

The opening 20 is closed with a door 30 when the recording tape cartridge 10 is in non-use. The door 30 is substantially L-shaped as seen in a plan view having substantially the same shape and size as that of the opening 20. The door 30 is preferably formed of an olefin resin material such as POM, but it is also possible that the door 30 may be formed either of a resin material such as POLYCARBONATE or a metal such as SUS.

A fulcrum shaft 26, which serves as a rotation fulcrum for the door 30, is provided on the front wall 12A, and it comprises a cylindrical boss 26A and a columnar boss 26B which are projectingly provided on the upper and lower case halves 14 and 16 respectively. The boss 26B on the lower case half 16 has its front end portion inserted in the boss 26B on the upper case half 14 in order to assemble the fulcrum shaft 26. Accordingly, the diameter of the boss 26B is slightly smaller than that of the boss 26A.

Still further, the door 30 is provided with three plate-like rotational sliding portions 32 which extend in parallel from the inner surface in the neighborhood of the right end portion thereof (at a position deviated a predetermined distance leftward from the right end). More specifically, the rotational sliding portions 32 extend from the upper and lower edges of the inner surface of the door 30 and an intermediate position deviated slightly downward from the center. Each of the rotational sliding portions 32 is formed with a through aperture through which the fulcrum shaft 26 is loosely inserted. Thus, the door 30 is rotatably supported with the fulcrum shaft 26 being inserted through the respective through apertures.

On the upper surface of the uppermost rotational sliding portion 32 and the lower surface of the lowermost rotational sliding portion 21 are provided annular protrusions 34 surrounding the through apertures, respectively. It is so arranged that a gap in the range from about 0.3 mm to 0.5 mm is defined between the upper edge surface 30A of the door 30 and the upper case half 14 and between the lower edge surface 30B of the door 30 and the lower case half 16, by disposing the annular protrusions 34 in contact with the upper and lower case halves 14 and 16 respectively.

Further, on the inner surface of the door 30 between the rotational sliding portions 32 are provided protrusions 36 which are arcuate in shape as seen in a sectional plan view and extends along the peripheral surface of the fulcrum shaft 26.

A wound portion 28A of a torsion spring 28 is inserted over the fulcrum shaft 26. Specifically, the wound portion 28A is mounted in such a manner that it is held between the lowermost and the intermediate rotational sliding portion 36 and inserted over the smaller-diameter boss 26B. Further, the torsion spring 28 is anchored at one end thereof to a rivet boss 38 of the case 12 (a rivet boss projectingly provided on the lower case half 16) and at the other end thereof to an edge portion on the right side of the protrusions 36.

The reel 40 is formed from a resin material and comprises the reel hub 42 having a bottomed cylindrical shape, the upper flange 44 integrally provided on and extending from the upper end portion of the reel hub 42, and the lower flange 46 attached to the lower end portion of the reel hub 42 by means of ultrasonic welding, as mentioned above. The upper and lower flanges 42 and 46 are formed from compatible resin materials and thus can be readily welded together by means of ultrasonic waves or the like. The gap between the upper and lower flanges 44 and 46 is defined so as to be substantially equal to the width of the recording tape T, so that the widthwise position of the recording tape T wound on the reel hub 42 is controlled.

Further, as shown in FIGS. 2 and 3, the reel hub 42 is provided, on the lower flange 46 side, with a bottom wall 48 having a through hole 48A formed at an axial center portion thereof. A reel gear 50 is formed in an annular shape on the lower surface of the bottom wall 48. In response to the reel 40 being pressed against the lower case half 16 due to a biasing force of a compression coil spring 78, the reel gear 50 is exposed through a circular gear opening 18 formed at a generally axial center of the lower case half 16 so as to be meshed with a drive gear 102 provided on a rotary shaft 100 of the drive device, thereby transmitting a rotary force to the reel 40.

An annular reel plate 52 formed from a magnetic material is integrally fixed to a portion radially inside of the reel gear 50 using an insert molding technique or the like. Under a condition that the drive gear 102 and reel gear 52 are meshed with each other, the reel plate 52 is drawn due to a magnetic force of an annular magnet 106 interposed between the drive gear 102 and a release projection 104 which will be described below. This prevents an axial shift which tends to occur between the reel 40 and the rotary shaft 100 while at the same time making it possible to maintain the meshing relationship between the reel gear 50 and the drive gear 102. With such an arrangement, as the rotary shaft 100 rotates about its axis, the reel 40 is rotated therewith within the case 12.

Figure 4:
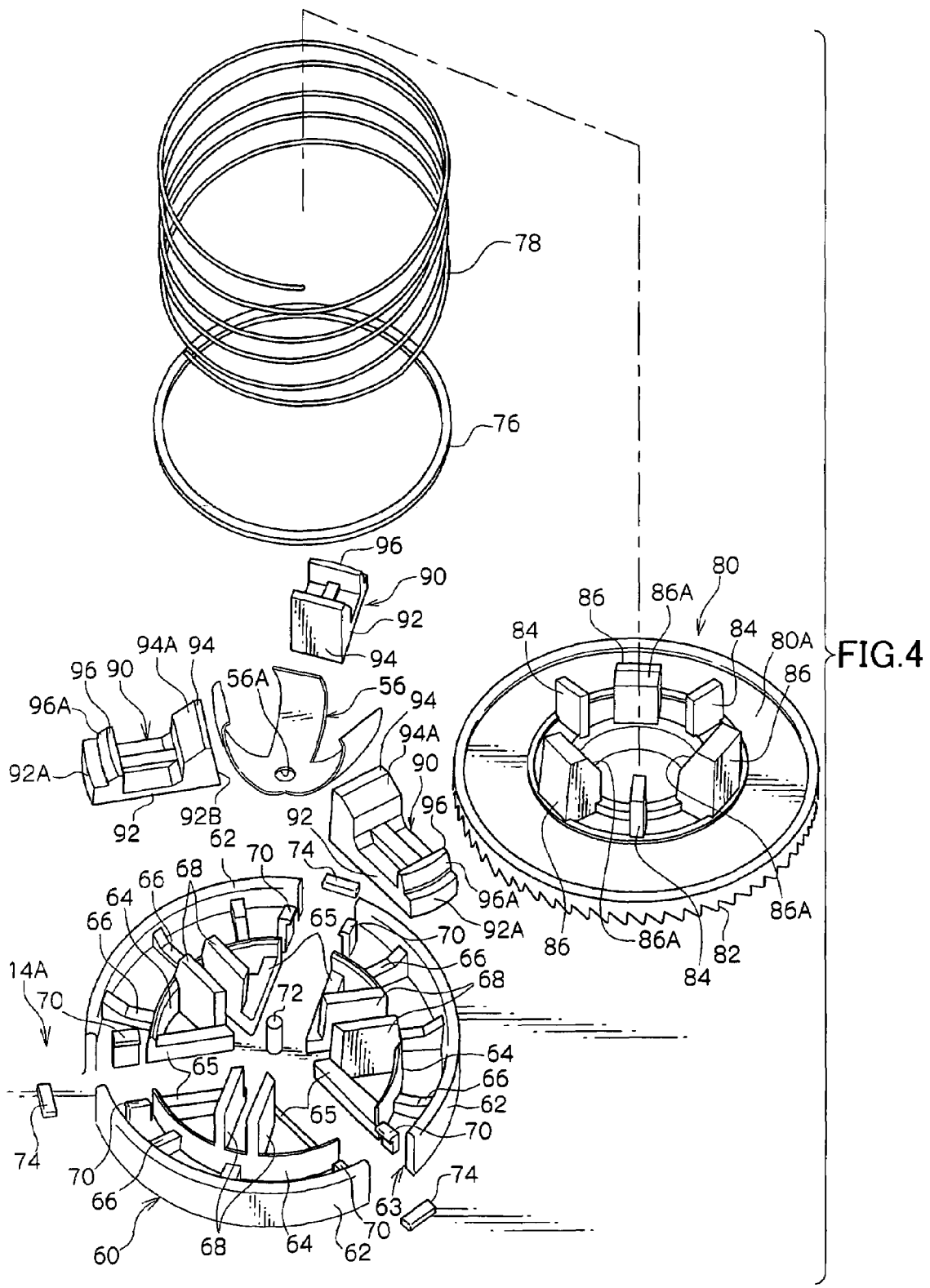
FIG. 4 is an exploded perspective view showing an arrangement of mounting portion provided in an upper case half according to an embodiment of the present invention.

Meanwhile, on the upper surface side of the bottom wall 48 of the heel hub 42, an engagement gear 54 is annularly formed which is adapted to be meshed with a brake gear 82 of a brake member 80. As shown in FIG. 4, the brake member 80 is formed in a shape of a disk and accommodated within the reel hub 42 so as to be movable vertically (in an axial direction of the reel 40), with the brake gear 82 being provided annularly at an outer periphery of the lower surface thereof.

Further, on the upper surface of the brake member 80 are provided upright, with equal spacings and in an alternate form, a plurality of (three in this embodiment) plate-like guide portions 84 which are adapted to be interposed between guide wall portions 68 (described later) of the upper case half 14 and a plurality of (three in this embodiment) generally rectangular column-shaped engagement projections 86 which are adapted to be engaged with cam portions 94 of a plurality of (three in this embodiment) lock members 90 which will be described later. Each of the engagement projections 86 has its radially inside portion shaped to form a tapered surface 86A having an inclination in the range of 30-60 degrees, preferably of 45 degrees and adapted to be disposed in engagement with a tapered surface 94A formed on the cam portion 94 of each lock member 90.

Still further, on the upper surface of the brake member 80, outside the guide portions 84 and engagement projections 86, a flat surface 80A is provided in an annular form which is adapted to be engaged with a lower end of a compression coil spring 78, which serves as a biasing member, when the recording tape cartridge has been assembled.

Furthermore, at a center portion of the lower surface of the brake member 80 is projectingly provided a generally columnar operation projection 88 which can be inserted through the through hole 48A and disposed in contact with a release projection 104 which is projectingly provided at an axial center portion of the rotary shaft 100 of the drive device (see FIGS. 2 and 3). It should be noted that the operation projection 88 has a height such that the operation projection 88 does not extend downward out of the through hole 48A (the bottom wall 48)(a height such that the operation projection 88 is disposed within the through hole 48A), as shown in the drawing, thereby preventing the brake member 80 from being moved upward inadvertently.

Figure 5:
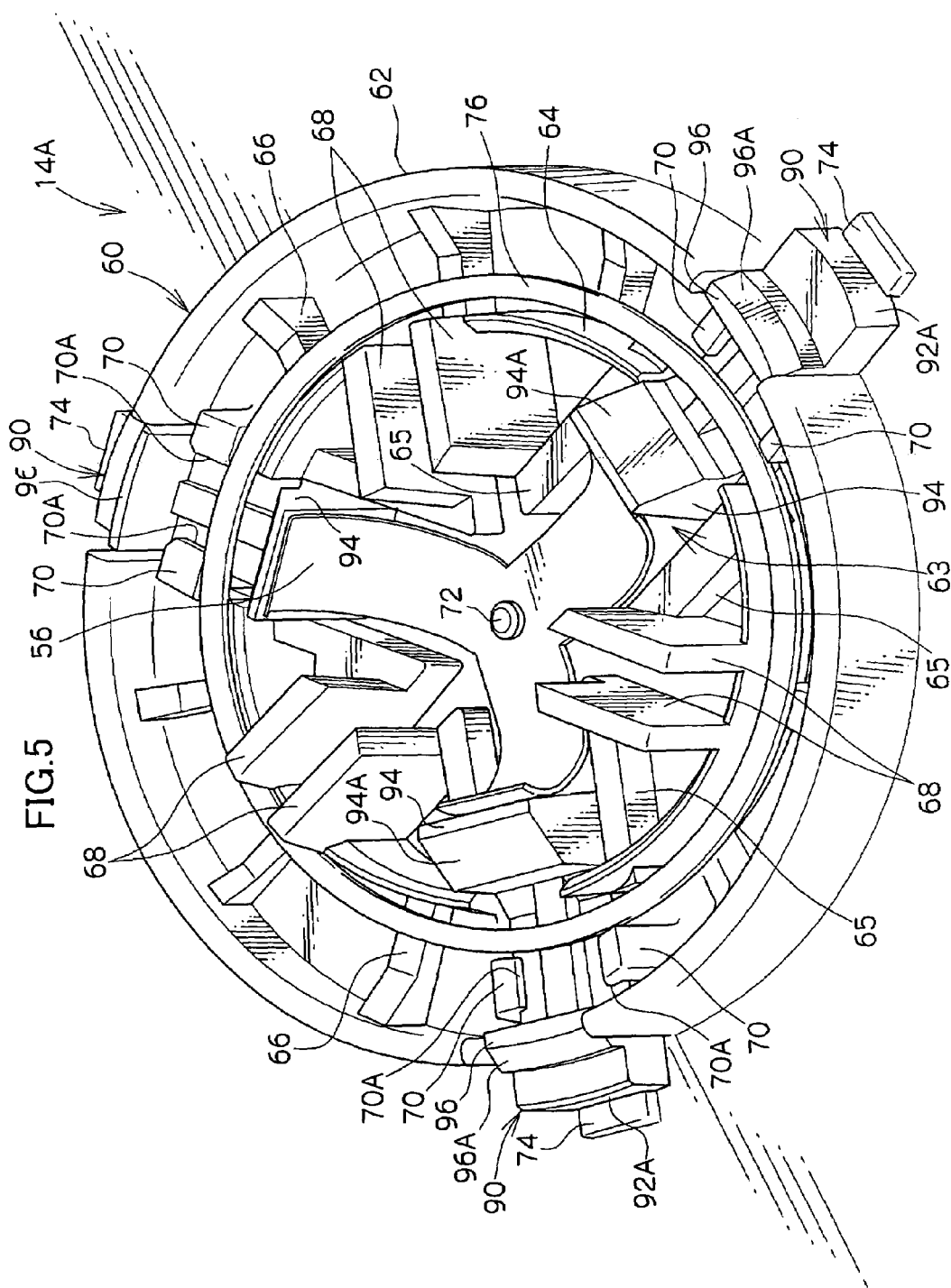
FIG. 5 is a perspective view showing the mounting portion provided in the upper case half.

As shown in FIGS. 4 and 5, a mounting portion 60 is formed at a generally axial center portion of the inner surface of top plate 14A of the upper case half 14 (at an axial center portion of the reel hub 42). The mounting portion 60 slidably accommodates the plurality of (three) lock members 90 and so forth which are engaged with the upper edge portion of the reel hub 42 from the inner peripheral surface side thereof, thereby preventing the reel 40 from being moved axially (vertically).

The mounting portion 60 comprises two types of cylindrical walls 62 and 64 which are provided upright in the form of concentric outer and inner circles respectively, as seen in a plan view, the outer one of which is made higher than the inner one. The cylindrical walls 62 and 64 are notched at predetermined positions (at three positions spaced apart from each other at uniform intervals). Guide ribs 65 are provided upright inside of the notched portions of the cylindrical walls 64 in such a manner as to extend in radial directions. The lock members 90 are radially slidably accommodated in accommodation portions 63 defined between the guide ribs 65.

A plurality of (nine in this embodiment) plate-like support ribs 66 are provided upright between the cylindrical walls 62 and 64 in a manner to interconnect the cylindrical walls 62 and 64. Further, between the respective accommodation portions 63 and inside of the cylindrical walls 64 are provided in pairs guide wall portions 68 between which the guide portions 84 of the brake member 80 are inserted, wherein the number of pairs of the guide wall portions 68 is equal to that of the guide portions. The pairs of the guide wall portions 68 are projectingly provided in a manner to extend in radial directions so as to be flush at outer end surfaces thereof with the outer peripheral surfaces of the cylindrical walls 6, and the space between the guide wall portions 68 of each pair is made substantially equal to or slightly larger than the thickness of each guide portion 84.

Figure 6:
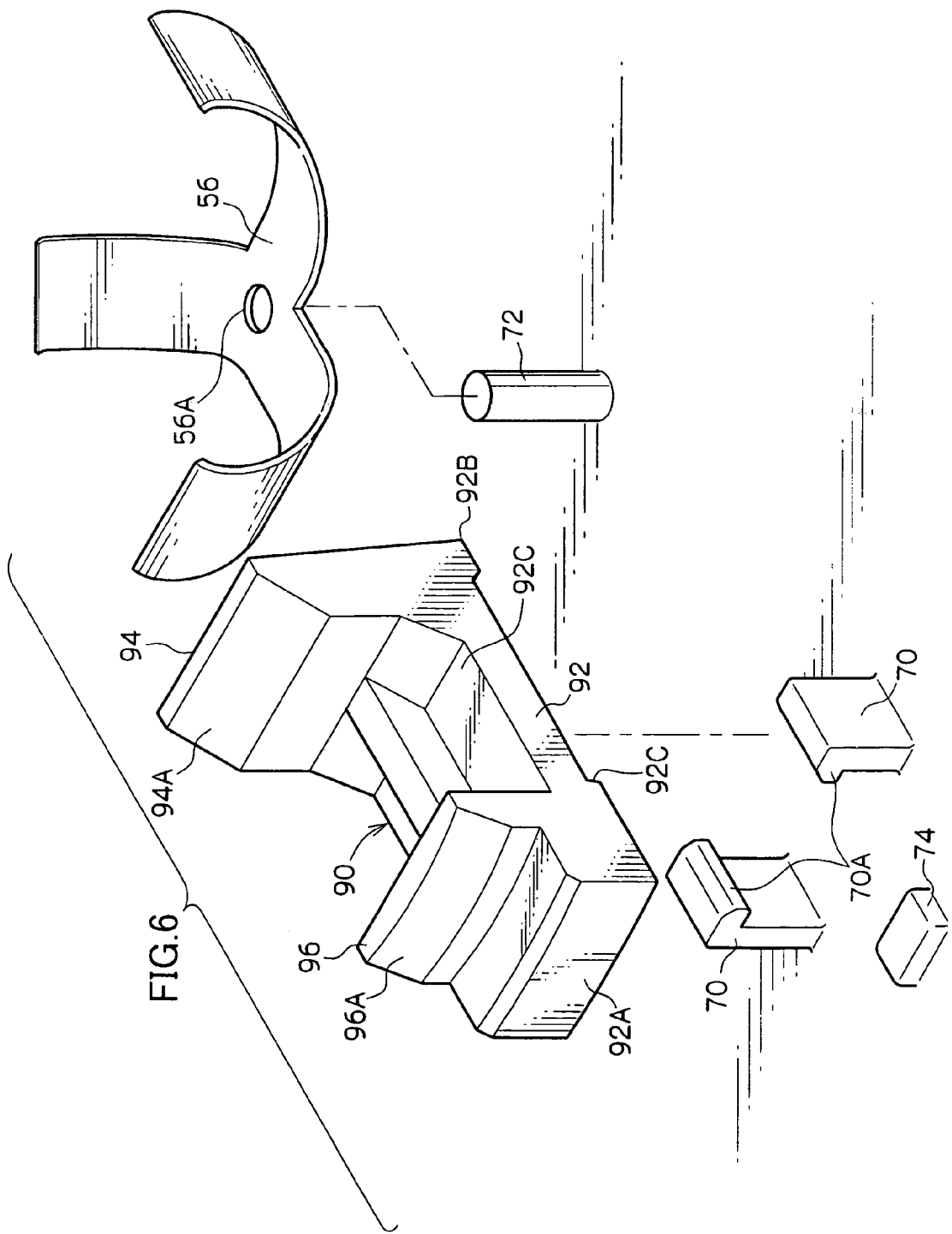
FIG. 6 is a perspective view showing a manner in which a lock member and a leaf spring are incorporated.
Figure 7:
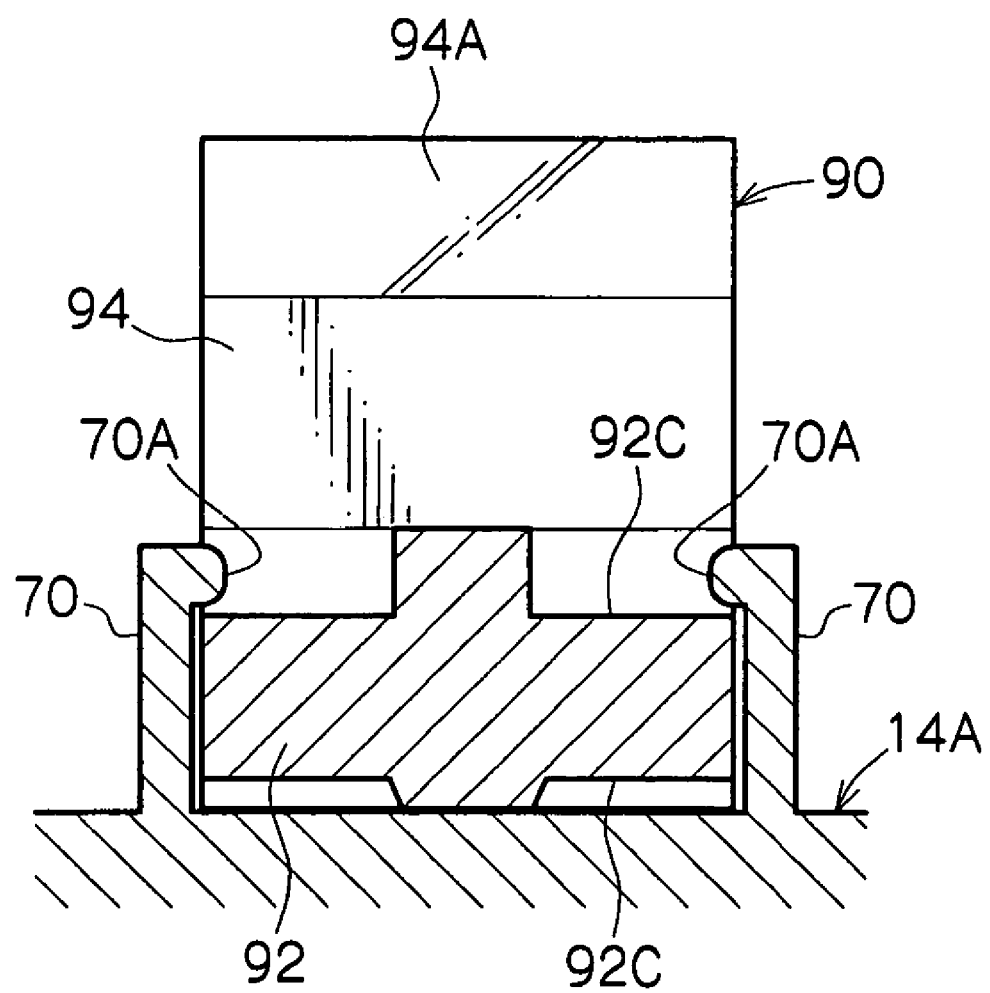
FIG. 7 is a sectional view showing the lock member supported on a support body.

Further, pairs of holding portions 70 are projectingly provided between the cylindrical walls 62 and 64 at the opposite sides of the accommodation portions 63, each pair of the holding portions 70 being adapted to hold a respective one of the lock members 90 slidably (with a small gap). On the leading ends (lower end) of the holding portions 70 of each pair are provided undercut portions 70A which are formed as projections extending inward with respect to each other (toward the lock member 90), as shown in FIGS. 6 and 7. The holding portions 70 serve to temporarily support the lock members 90 to such an extent as to prevent the lock members 90 from dropping down (being removed) from the mounting portion 60 (from the accommodation portions 63) when the upper case half 14 is turned upside down so that the inner surface of the top plate 14A faces down and covers the lower case half (during the assembly of the case 12), after each of the lock members 90 has been incorporated in place.

More specifically, when molded in a mold, the undercut portions 70A are protruded inward to such an extent as to be capable of being drawn from the mold (about 0.1 mm-0.5 mm, preferably about 0.3 mm). In addition, the undercut portions 70A are formed in a generally arcuate shape as seen in a sectional side view, thereby facilitating the drawing thereof from the mold. Meanwhile, the holding portions 70 are formed to be about 4 mm in height, and about 0.35 mm-1.2 mm, preferably about 0.5 mm-0.8 mm in thickness.

Further, the holding portions 70 may be formed either integrally with the upper case half 14 or separately from the upper case half 14 and fixed thereto. With an arrangement that the holding portions 70 are formed separately from the upper case half 14 and fixed thereto, it is possible that the lock members 90 may be incorporated after having been placed on the upper case half 14 so that the undercut portions 70A can be formed either in a further protruding shape or gate-like shape (lateral U-shape), thereby making it possible to remove the necessity for a stopper member 76 which will be described below.

At generally a center portion of the inner surface of the top plate 14A (on an axial line of the reel hub 42 and at a center of the mounting portion 60) is projectingly provided a crimping pin 72 to which a leaf spring 56 is attached. The leaf spring 56 is formed in such a manner that three branches extend from a center thereof (in a manner to form three wings) and are disposed in contact with radially inward surfaces of cam portions 94 of the respective lock members 90 respectively. A crimping hole 56A is formed at the center of the leaf spring 56.

Thus, the leaf spring 56 is mounted to the upper case half 14 by inserting and crimping (collapsing) the crimping pin 72 of the upper case half 14 in the crimping hole 56A. As will be appreciated, the arrangement that the leaf spring 56 serving as biasing means is disposed at generally a center portion of the inner surface of the tope plate 14A (at the center of the mounting portion 60) is advantageous in that a dead space in the case 12 can be effectively utilized and the biasing means can be constructed to be compact. With such an arrangement, the lock members 90 are normally biased from the center of the mounting portion 60 (the center of the reel 40) toward radially outward sides.

Further, stopper ribs 74 are projectingly provided on the top plate 14A at predetermined positions on lines of extension from the accommodation portions 63 outside of the cylindrical wall 62 (at positions where a certain amount of tension described below can be applied). The stopper ribs 74 are adapted to serve as position regulating means for temporarily retaining the lock members 90 biased by the leaf spring 56 (until the upper case half 14 is attached to the lower case half 16) when the lock members 90 and leaf spring 56 are incorporated. Consequently, since the lock members 90 are supported while being applied with a certain amount of tension by the leaf spring 56 and stopper ribs 74, the lock members 90 can be more effectively prevented from dropping down. Another advantage is that the leaf spring 56 can be incorporated easily and properly since the leaf spring 56 can be mounted even after a stopper member 76 described below has been attached to supporting ribs 66

Figure 8:
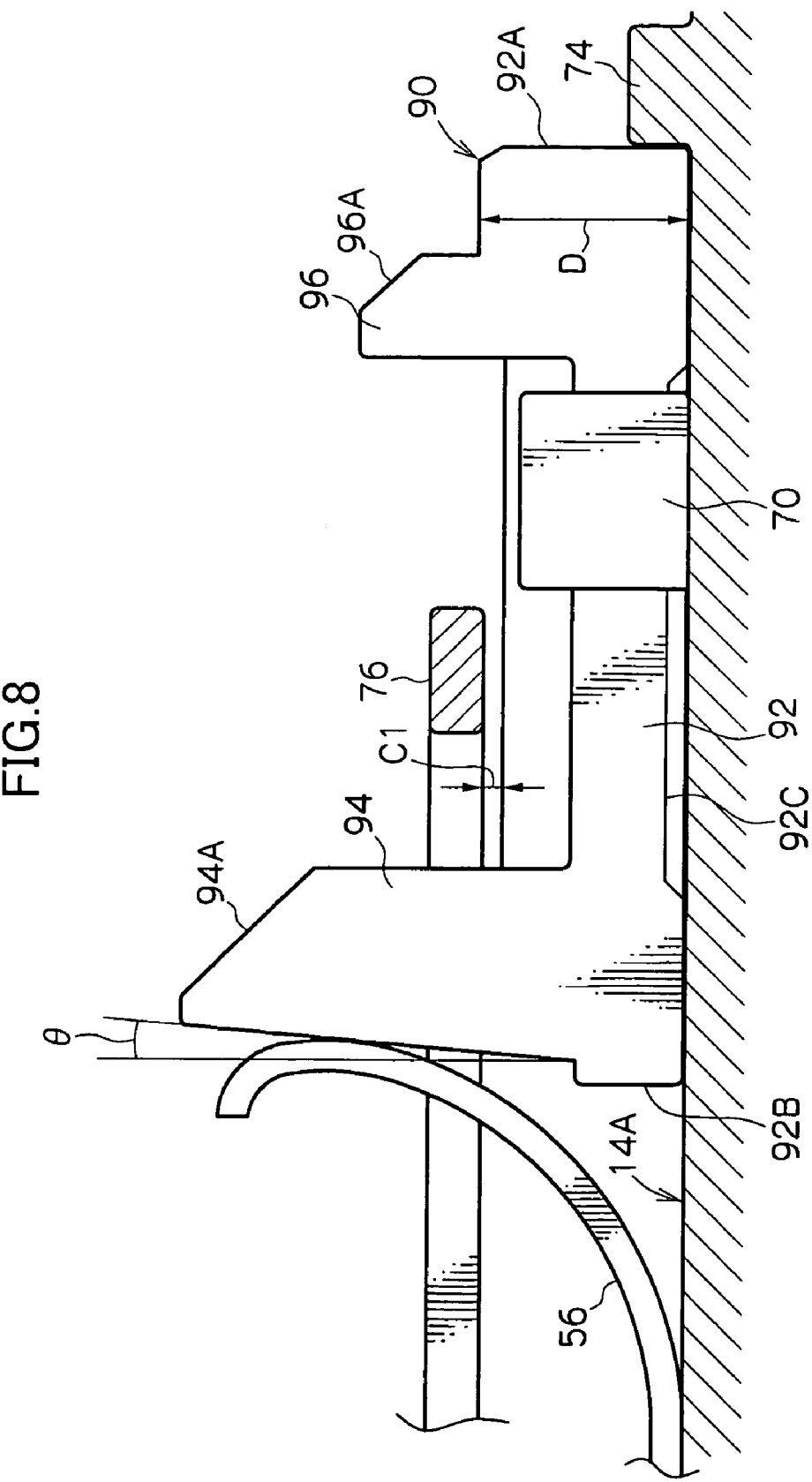
FIG. 8 is a side view showing the lock member supported on the support body.

After the lock members 90 are temporarily supported by the holding portions 70, a ring-shaped stopper member 76 formed from a plastic material is welded on the supporting ribs 66 by means of ultrasonic waves or the like. The stopper member 76 being adapted to serve as a dropping preventing member for permanently keeping the lock members 90 from sliding and dropping off. A predetermined clearance C1 (C1=about 0.05 mm-0.4 mm) is secured between the stopper member 76 and the lock members 90 as shown in FIG. 8 in order not to hinder the lock members 90 when the lock members 90 are caused to slide, as shown in FIG. 8. The heights of the supporting ribs 66 are so defined as to secure the clearance C1.

Further, when the recording tape cartridge 10 is assembled (when the upper case half 14 is placed over the lower case half 16), the compression coil spring 78 is engaged at the upper end thereof with the stopper member 76, so that the compression coil spring 78 is held between the stopper member 76 (the upper case half 14) and the flat surfaces 80A (the brake member 80). The upper end of the compression coil spring 78 may be disposed in contact with the supporting ribs 66 instead of with the stopper member 76.

When the upper end of the compression coil spring 78 is disposed in contact with the stopper member 70, it is possible to arrange that the stopper member 76 may not be welded onto the supporting ribs 66. The stopper member 76 is not limited to a ring-like configuration shown in the drawings, and it is only required that the stopper member 76 be at least bridged between the supporting ribs 66 on the opposite sides of the lock members 90 so as to prevent the lock members 90 from dropping down all the time. An arrangement may be made such that It is possible that simply the stopper member 76 is provided while the holding portions 70 are omitted. An arrangement may also be made such that simply the holding portions 70 are provided while the stopper member 76 is omitted.

The lock members 90 are supported to be radially movable within the accommodation portions 63 while being prevented from dropping down by means of the holding portions 70 and the stopper member 76. Each of the lock members 90 includes a generally rectangular column-shaped body portion 92 which is disposed in sliding contact with the inner surface of the top plate 14A of the upper case half 14. A generally rectangular column-shaped cam portion 94, which has substantially the same width as that of the body portion 92, is integrally provided, projecting substantially in an axial direction of the reel 40, on a radially inward end portion 92B of each body portion 92. The end portion 92B, which extends more radially inward than the cam portion 94, serves as a "stabilizing portion". Accordingly, hereinafter, the "end portion 92B" will be referred to as "stabilizing portion 92B".

Each cam portion 94 is projectingly provided at a given height and inclined a predetermined angle θ toward the outside of each body portion 92, as shown in FIG. 8, whereby the biasing force of the leaf spring 56 is partly directed toward the upper case half 14 side while a radially outward end portion 92 of each lock member 90 (each body portion 92) is engaged with each stopper rib 74. Thus, the lock members 90, when incorporated, can be more positively prevented from dropping down from the accommodation portions 63, which results in a further enhanced incorporation capability.

An outward portion of the lower end surface of each cam portion 94 is configured into a tapered surface (cam surface) 94A which is inclined an angle in the range from 30 degrees to 60 degrees, preferably of 45 degrees and adapted to be engaged with tapered surface 86A of each engagement projection 86 of the brake member 80. The engagement projections 86 and cam portions 94 are both generally rectangular column-shaped so as to provide an enhanced rigidity and can be appropriately engaged with each other. It should be noted that the radially outward end portion 92A of each lock member 90 (each body portion 92) has a thickness D (see FIG. 8) which is substantially equal to a distance W (see FIG. 2) between the upper surface of the upper flange 44 and the inner surface of the top plate 14A when the reel 40 is located at the lowermost position in the case 12.

In the vicinity of the radially outward end portion 92A is integrally provided an engagement portion 96 which extends axially of the reel 40 (vertically) and has a predetermined height adapted to be engaged with the upper edge portion of the reel hub 42. The engagement portion 96 has a width the same as that of the body portion 92 and extends less than the cam portion 94. An outward portion of the lower end surface of the engagement portion 96 is configured as a tapered surface 96A inclined at a predetermined angle. The outer surface including the tapered surface 96A is made to be an arcuate surface which is in registration with the inner peripheral surface of the reel hub 42 as seen in a plan view.

Thus, the lock member 90, which is temporarily retained by the stopper rib 74, is configured such that the engagement portion 96 can be readily engaged with the upper edge portion of the reel hub 42 during the operation when the recording tape cartridge is assembled (when the upper case half 14 is placed to cover the lower case half 16). After engagement the radially outward end portion 92A of the body portion 92 is spaced apart from the stopper rib 74, as shown in FIG. 2.

It is preferable that the draft angle of the mold for the inner peripheral surface of the reel hub be zero degrees for permitting the outer surface of the engagement portion 96, except for the tapered surface 96A, to be engaged with (pressed against) the inner peripheral surface of the reel hub 42. When the draft angle is larger than zero degree, the upper edge portion of the reel hub 42 tends to expands outwardly (the diameter of the upper edge portion becomes large) so that a pressing force by the engagement portion 96 is decreased, as a result of which the lock members 90 may no longer function appropriately.

Figure 9:
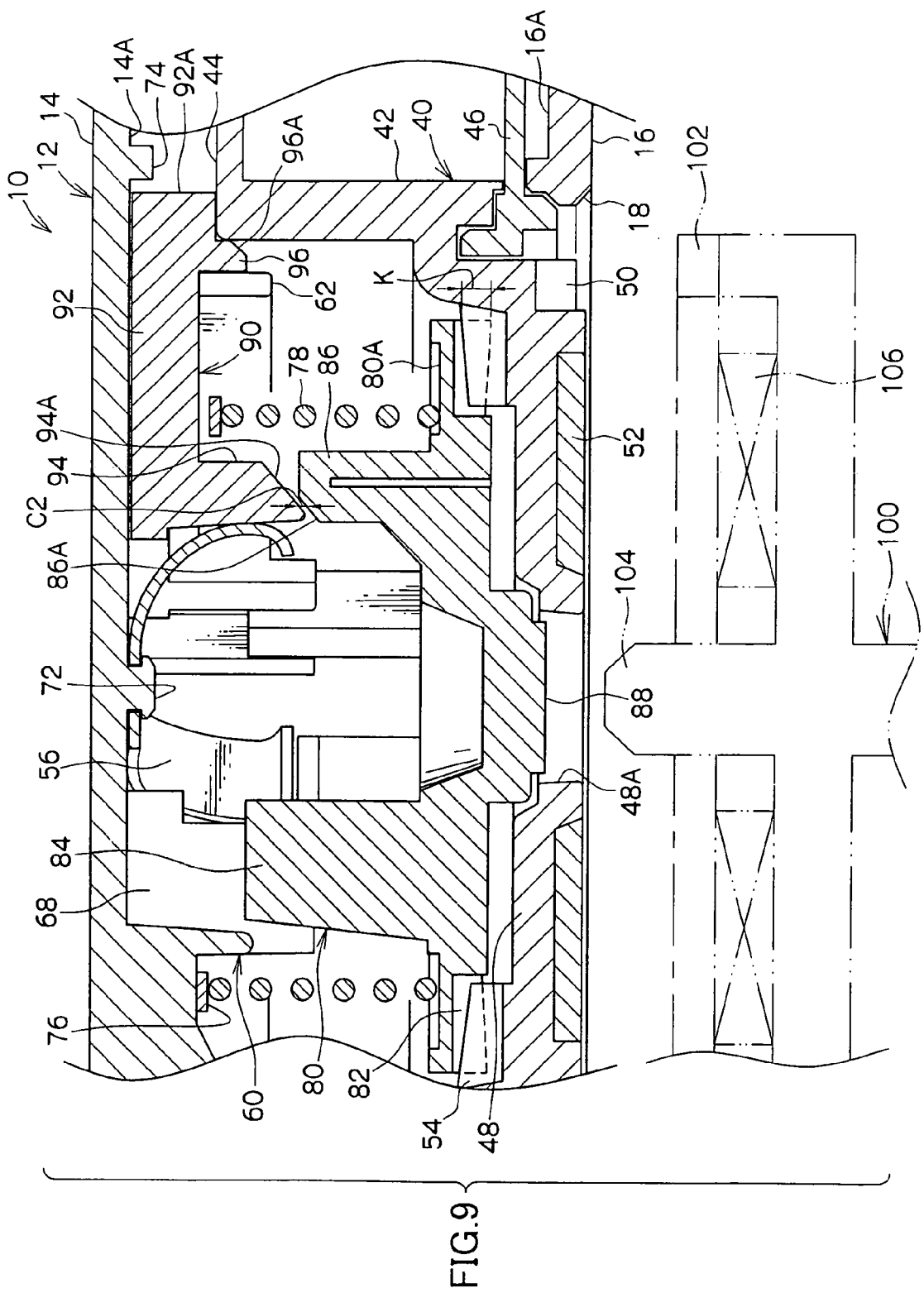
FIG. 9 is a fragmentary enlarged sectional side view showing the recording tape cartridge before the rotary shaft is moved up.

With the above-described arrangement, when the recording tape cartridge is in non-use, the brake member 80 is downwardly biased due to a biasing force of the compression coil spring 78, while the lock members 90 are biased radially outwardly due to a biasing force of the leaf spring 56, as shown in FIG. 9. Consequently, the brake member 80 is prevented from rotating with respect to the case 12 because of the guide portions 84 being inserted between the guide wall portions 68, and the reel 40 is prevented from being inadvertently rotated because of the brake gear 82 of the brake member 80 being strongly meshed with the engagement gear 54 in the reel hub 42.

When the recording tape cartridge 10 is in non-use, the reel 40 is prevented from being moved upward because of the engagement portions 96 of the lock members 90 being engaged with the upper edge portion of the reel hub 42, i.e., because of the outer surfaces of the engagement portions 96 except for the tapered surfaces 96A being pressed against the inner peripheral surface of the reel hub 42 so that the end portions 92A radially outward of the engagement portions 96 of the body portions 92 are interposed between the upper surface of the upper flange 44 and the inner surface of the top plate 14A (the lower surfaces of the end portions 92A are either disposed either in surface contact with the upper surface of the upper flange 44 or disposed in opposing relationship with the upper surface of the upper flange 44 with an extremely small gap maintained therebetween).

When the recording tape cartridge is in non-use, the engagement projection 86 and the cam portion 94 are disposed out of contact with each other so as to prevent the component force of the leaf spring 56 from acting on the brake member 80. The clearance 2C between the opposing tapered surfaces 86A and 94A in the axial direction of the reel 40 (in the direction of movement of the brake member 80) is made smaller than an amount of meshing K between the brake gear 82 and the engagement gear 54 (in other words, than an ascending stroke of the brake member 80 until the meshing between the brake gear 82 and the engagement gear 54 is released).

This is because if the clearance C2 is larger than the amount of meshing D, the brake member 80 will be very likely to be moved upward a distance equal to the clearance C2 by an impact due to dropping or the like and consequently the reel 40 will become capable of being inadvertently rotated. Accordingly, the clearance C2 between the engagement projection 86 and the cam portion 94 is extremely small, and the gap between the lower surface of the outward end portion 92A of the body portion 92 and the upper surface of the upper flange 44 is substantially equal to, or becomes even smaller than the clearance C2. (The lower surface of the outward end portion 92A of the body portion 92 and the upper surface of the upper flange 44 are disposed substantially in surface contact with each other.) Thus, when the recording tape cartridge is in non-use, the reel 40 and the brake member 80 are substantially incapable of being moved upward (incapable of being moved axially of the reel). (Even if moved upward, the reel 40 and brake member 80 will be moved upward only a distance equal to the small clearance C2.)

Figure 10:
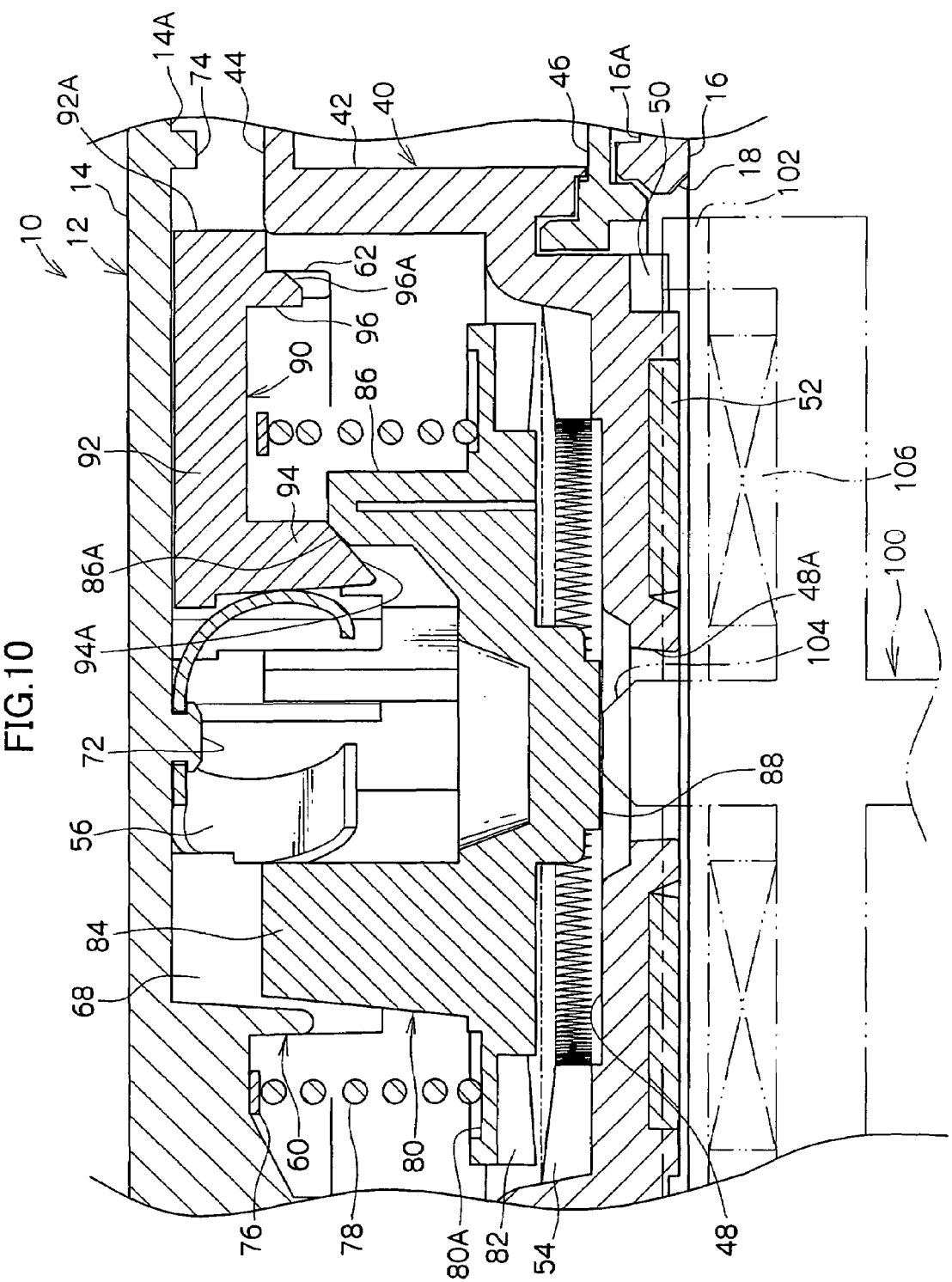
FIG. 10 is a fragmentary enlarged sectional side view showing the recording tape cartridge when the rotary shaft is being moved up.
Figure 11:
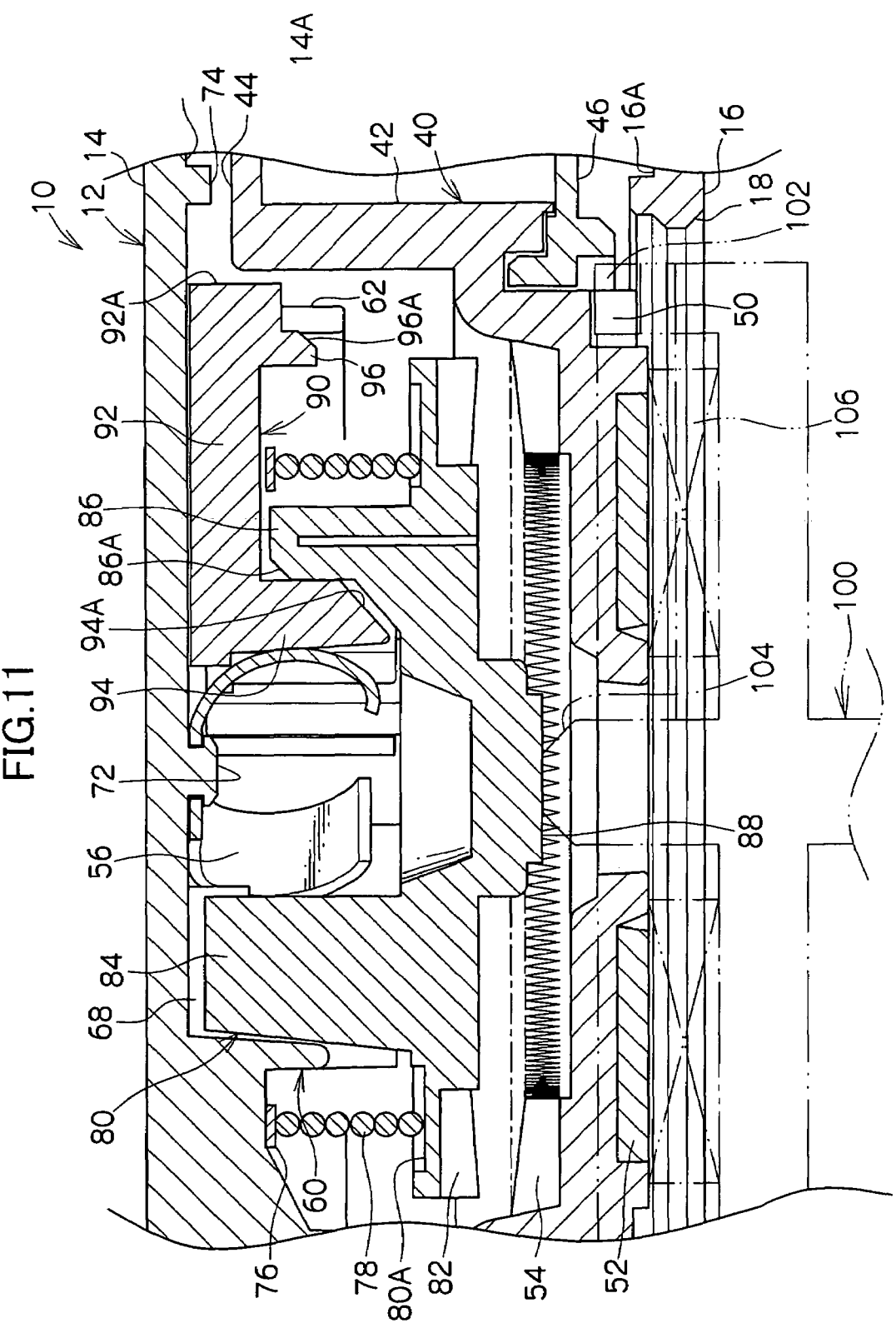
FIG. 11 is a fragmentary enlarged sectional side view showing the recording tape cartridge after the rotary shaft has been moved up.

When the recording tape cartridge is in use, the release projection 104 is disposed in contact with the operation projection 88, and the brake member 80 is thereby moved upward to reach a predetermined height against a biasing force of the compression coil spring 78, as shown in FIG. 10. As a result, the tapered surface 86A of the engagement projection 86 and the tapered surface 94A of the cam portion 94 are disposed in contact with each other, and further the tapered surface 94A is caused to slide on the tapered surface 86A so that the cam portion 94 is caused to intrude inside of the engagement projection 86, as shown in FIG. 11.

More specifically, the brake gear 82 and the engagement gear are released from the meshing state; each lock member 90 is caused to slide radially inwardly against a biasing force of the leaf spring 56; the outside surface of the engagement portion 96 is spaced apart from the inner peripheral surface of the reel hub 42; and the outside end portion 92A of the body portion 92 is moved out from between the upper surface of the upper flange 44 and the inner surface of the top plate 14A (the lower surface of the end portion 92A is spaced apart from the upper surface of the upper flange 44). This permits the reel 40 to be rotatable and moved to reach a predetermined height within the case 12.

When the brake member 80 is moved upward, the cam portion 94 is caused to intrude inside of the engagement projection 86 as mentioned above, and thereupon, only the outside surface of the cam portion 94 is brought into contact with the inside surface of the engagement projection 86. The upper end surface of the engagement projection 86 is disposed out of contact with the lock member 90, and the lower end surface of the cam portion is also disposed out of contact with the brake member 86. Further, since the inside surface of the engagement projection 86 and the outside surface of the cam portion 94 each has a mold draft angle of 0 degree, the pressing force (biasing force) of the leaf spring 56 which presses the lock member 90 is received by the inner peripheral surface of the engagement projection 86, so that no component force tending to press the brake member 80 down is caused to occur.

Thus, during rotation of the reel 40, the pressing force (biasing force) of the leaf spring 56 is permitted to work in a radial direction of the reel 40 and not axially of the reel 40 (the biasing force is not transmitted axially of the reel 40). Consequently, each lock member 90 is stably held in an unlock state. Further, since the pressing force (biasing force) exerted axially (vertically) of the reel 40 includes only the biasing force of the compression coil spring 78 as is the case with the prior art, it is possible to arrange, despite the provision for the leaf spring 56, that no extra load is applied to the rotary shaft 100 in an axial direction (in a vertical direction).

Preferably, as shown in FIGS. 7 and 8, the body portion 92 of each lock member 90 is formed with a recess 92C (alternatively, a convex) in the upper surface which is disposed in contact with the nner surface of the top plate 14A of the upper case half 14 and also in the lower surface which is disposed in contact with the stopper member 76. By forming such recesses 92C (alternatively, convexes), it is possible to decrease the contact area between the body portion 92 and the inner surface of the top plate 14 and that between the body portion 92 and the stopper member 76 so that each lock member 90 is permitted to slide with a low resistance, Description will next be made of the operation of the recording tape cartridge 10 constructed as described above. With the recording tape cartridge 10, when it is in non-use (when it is not loaded into a drive device), the opening 20 is closed with the door 30 due to a biasing force of the torsion spring 28. The leader tape 22 is positioned along the left side wall 12B with the vertically extending protrusions 22 being accommodated (inserted) in the accommodation recesses 24.

As shown in FIGS. 2 and 9, the reel 40 is biased downward through the brake member 80 with the aid of the compression coil spring 78. More specifically, the brake gear 82 of the brake member 80 is strongly meshed with the engagement gear 54 in the reel hub 42 due to the biasing force of the compression coil spring 78, thereby preventing inadvertent rotation of the reel 40.

Further, each lock member 90 is biased from the center (the axial center of the reel 40) of the mounting portion 60 in a radially outward direction, and thus the engagement portion 92 thereof is engaged with the upper edge portion of the reel hub 42. That is, the inner peripheral surface of the reel hub 42 is pressed by the outside surface excluding the tapered surface 96A of the engagement portion 96, and the end portion 92A, which is provided radially outside of the engagement portion 96, of the body portion 96 is interposed between the upper surface of the upper flange 44 and the inner surface of the top plate 14A (the lower surface of the end portion 92A is disposed either in surface contact or in minutely spaced opposing relationship with the upper surface of the upper flange 44).

The outside end portion 92A of the lock member 90 (body portion 92) is configured such that the thickness D thereof is substantially equal to the distance W between the upper surface of the upper flange 44 and the inner surface of the top plate 14A when the reel 40 is located at the lowermost position, so that the reel 40 is prevented from being moved upward with the aid of the lock members 90. The reel 40 will never be moved upward even if the recording tape cartridge 10 is impacted due to dropping or the like.

Further, since the clearance C2 between the cam portion 94 of each lock member 90 and the engagement projection 86 of the brake member 80 is extremely small, or smaller than the amount of meshing K between the brake gear 82 and the engagement gear 54, the brake member 80 will not be substantially moved upward even if the recording tape cartridge 10 is impacted due to dropping or the like. Thus, there is no possibility that the brake gear 82 is disengaged from the engagement gear 54, so that no such trouble that the brake member 80 is retained while being inclined (on the point of falling) is experienced. Hence, no adverse influence is imparted to the recording tape T.

When recording data onto the recording tape of the recording tape cartridge 10 or reproducing data recorded on the recording tape of the recording tape cartridge 10, the recording tape cartridge 10 is loaded into a drive device (not shown). More specifically, the recording tape cartridge 10 is inserted from the front wall 12A side into a loading slot (not shown).

In response to the loading operation, the opening/closing member (not shown) of the drive device approaches relative to and engages with a right end portion of the door 30 (on the right hand side relative to the culcrum shaft 26), thereby pressing the engagement recess. Consequently, the door 30 is rotated about the fulcrum shaft 26 against a biasing force of the torsion spring 28 so that the opening 20 is opened.

At this point, a gap of about 0.3 mm-0.5 mm is defined by the annular protrusions 34 between the upper end surface of the door 30 and the upper case half 14 and between the lower end surface of the door 30 and the lower case half 16. At the door 30, it is only the annular projections 34 that are contacted with the upper case half 14 and lower case half 16. In this way, the door 30 can be rotated with a low sliding resistance.

Preferably, at least the rotational sliding portions 32 and annular protrusions 34 of the door 30 are formed from an olefin system resin such as POM By so doing, it is possible to further decrease the sliding resistance of the door 30 with respect to the upper and lower case halves 14 and 16 formed from resin such as POLYCARBONATE and also the sliding resistance thereof with respect to the fulcrum shaft 26.

Further, since the wound portion 28A of the torsion spring 28 is interposed between the rotational sliding portions 32, the rotational sliding portions 32, when formed from resin such as POM, become less likely to be abraded than the case 12 formed from resin such as POLYCARBONATE. That is, even when the wound portion 28A of the torsion spring 28 is caused to slide as the door 30 is rotated, abraded particles will be less likely to be produced so that no adverse influence will be imparted to the recording tape In any event, when the opening 20 is opened with the door 30 rotated, the draw-out member (not shown) of the drive device is made to approach from the left side wall 12B side to the opening 20 and engaged with the aperture 22A of the leader tape 22. At this point, the leader tape 22 is in a stand-by position while being alongside the left side wall 12B, so that the draw-out member can be surely engaged with the aperture 22A.

With the draw-out member engaged with the aperture 22A, the leader tape 22 is drawn out of the case 12 in response to the draw-out member being spaced apart from the opening 20. Subsequently, the leader tape 22 as drawn out of the case 12 is wound onto a take-up reel (not shown) of the drive device.

As shown in FIG. 10, the rotary shaft 100 of the drive device is caused to intrude through the gear opening 18 and approaches toward the bottom wall 48 of the reel 40. More specifically, the operation projection 88 is pressed by the release projection 104 so that the brake member 80 is moved upward against a biasing force of the compression coil spring 78, and concomitantly, the engagement gear 54 and the brake gear 82 are released from the meshing state, but prior to this, the engagement projection 86 is brought into contact with the cam portion 94 of the lock member 90 so as to further press the cam portion 94 upward.

As a consequence, the tapered surface 94A of the cam portion 94 is caused to slide on the tapered surface 86A of the engagement projection 86 so that the lock member 90 is caused to slide on the inner surface of the top plate 14A (in the accommodation portion 63) radially inwardly against a biasing force of the leaf spring 56. At this point, the lock member 90 can slide with a low resistance by virtue of the fact that the body portion 92 is formed with the recess 92C. Further, the engagement portion 86 can appropriately engage the cam portion 94 since an angle in the range of 30-60 degrees (preferably of 45 degrees) is maintained between the tapered surfaces 86A and 94A which contact each other.

Furthermore, when the tapered surface 86A of the engagement projection 86 contacts and pushes up the tapered surface 94A of the cam portion 94, a torque that acts to cause the end portion 92A to be directed downward is imparted to the lock member 90. However, a reactive force against the torque can be produced by stabilizing portion 92B and the holding portions 70 (stopper member 76).

In other words, the torque can be accommodated because of the stabilizing portion 92B contacting the inner surface of the top plate 14A and because of the lock member 90 contacting the undercut portion 70A of the holding portion 70 (stopper member 76). Thus, lock member 90 is permitted to slide stably without being removed from the accommodation portion 63 (mounting portion 60).

In response to the lock member 90 being made to slide radially inwardly in the accommodation portion 63 (FIG. 4), the outside surface of the engagement portion 96 of the lock member 90 is spaced apart from the inner peripheral surface of the reel hub 42 so that the outside end portion 92A of the body portion 92 is removed from between the upper surface of the upper flange 44 and the inner surface of the top plate 14A (the lower surface of the end portion 92A is spaced apart from the upper surface of the upper flange 44).

Further, as shown in FIGS. 3 and 11, the cam portion 94 is caused to intrude inside of the engagement projection 86, as a result of which the outside end portion 92A of the body portion 92 is located inside of the reel hub 42, and the outside surface of the cam portion 94 is disposed in contact with the inside surface of the engagement projection 86. Consequently, the engagement of the engagement portion 96 with the upper edge portion of the reel hub 42 is released so that the lock member 90 is held in an unlocked state.

Still further, in response to the rotary shaft 100 being moved upward, the drive gear 102 is brought into meshing relationship with the reel gear 50, and the reel plate 52 is attracted to the magnet 106. When the drive gear 102 is meshed with the reel gear 50, the reel 40 is moved upward to reach a predetermined height and permitted to rotate within the case 12. The drive gear 102, i.e., the reel 40 is rotationally driven in synchronism with a take-up reel (not shown) so that the recording tape T is transferred sequentially to the drive device. Recording of data onto the recording tape T or reproduction of data recorded on the recording tape T is performed by means of a recording/reproducing head (not shown) of the drive device.

In order to unload the recording tape cartridge 10 from the drive device, the drive gear 102 is first rotated in reverse to rewind the recording tape T onto the reel 40. Subsequently, the leader tape 22 is removed from the take-up reel and returned into the case 12 via the opening 20. That is, the protrusions 22B of the leader tape 22 are accommodated (inserted) in the accommodation recesses 24, and held at a predetermined position within the case 12.

Thereafter, the rotary shaft 100 is moved downward so that the drive gear 102 is released from the meshing relationship with the reel gear 50 and the reel plate 52 is spaced apart from the magnet 106. Consequently, the reel 40 is moved downward via the brake member 80 due to a biasing force of the compression coil spring 78. Thereupon, the lock member 90 is made to slide radially outwardly within the accommodation portion 63 due to a biasing force of the leaf spring 56 so that the tapered surface 94A of the cam portion 94 is caused to slide on the tapered surface 86A of the engagement projection 86. Also in this case, the lock member 90 is permitted to stably slide, without being removed from the accommodation portion 63 (mounting portion 60).

The engagement portion 96 is engaged with the upper edge portion of the reel hub 42 as a result of the engagement projection 86 being spaced apart from the cam portion 94. That is, the outside surface of the engagement portion 96 excluding the tapered surface 96A is pressed against the inner peripheral surface of the reel hub 42 due to a biasing force of the leaf spring 56, and the outside end portion 92A of the body portion 92 is interposed between the upper surface of the upper flange 44 and the inner surface of the top plate 14A (the lower surface of the end portion 92A is disposed either in surface contact or in minutely spaced opposing relationship with the upper surface of the upper flange 44). In this way, the reel 40 is again placed in a state in which the reel 40 is prevented from being moved upward.

At this point, the brake gear 82 is strongly meshed with the engagement gear 54 so that inadvertent rotation of the reel 40 is prevented. Further, the rotary shaft 100 is removed from the gear opening 18, subsequently the recording tape cartridge 10 is ejected from the loading slot, and the opening-closing member is spaced apart from the right end portion of the door 30 as a result of the ejecting operation. Thereupon, the door 30 is rotated about the fulcrum shaft 26 in the direction opposite to the direction mentioned above due to a biasing force of the torsion spring 28, thus closing the opening 20. In this manner, the recording tape cartridge 10 has the opening 20 closed, and is ejected from the drive device.

Referring now to FIGS. 12 to 17, description will be made of a modified embodiment which uses coil springs 58 in lieu of the leaf spring 56 as biasing means for biasing lock members 90. In theses figures, the corresponding parts are indicated by identical reference numerals, and a further description thereof will be omitted. A coil spring 58 is provided for each lock member. Accordingly, in this case, three such coil springs are provided which are advantageously less expensive than the leaf spring 56.

Figure 12:
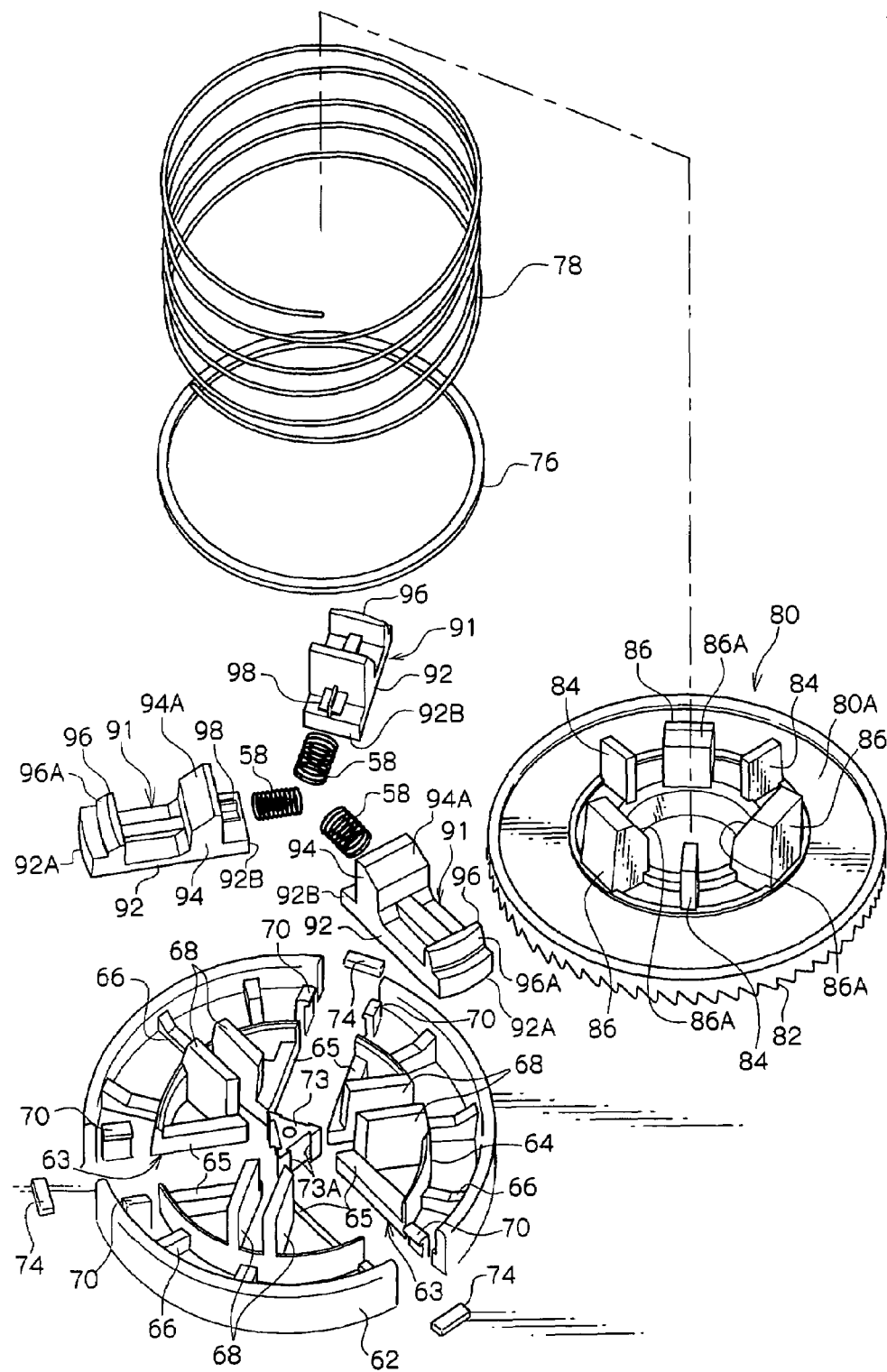
FIG. 12 is an exploded perspective view showing an arrangement of mounting portion provided in an upper case half according to another embodiment of the present invention.
Figure 13:
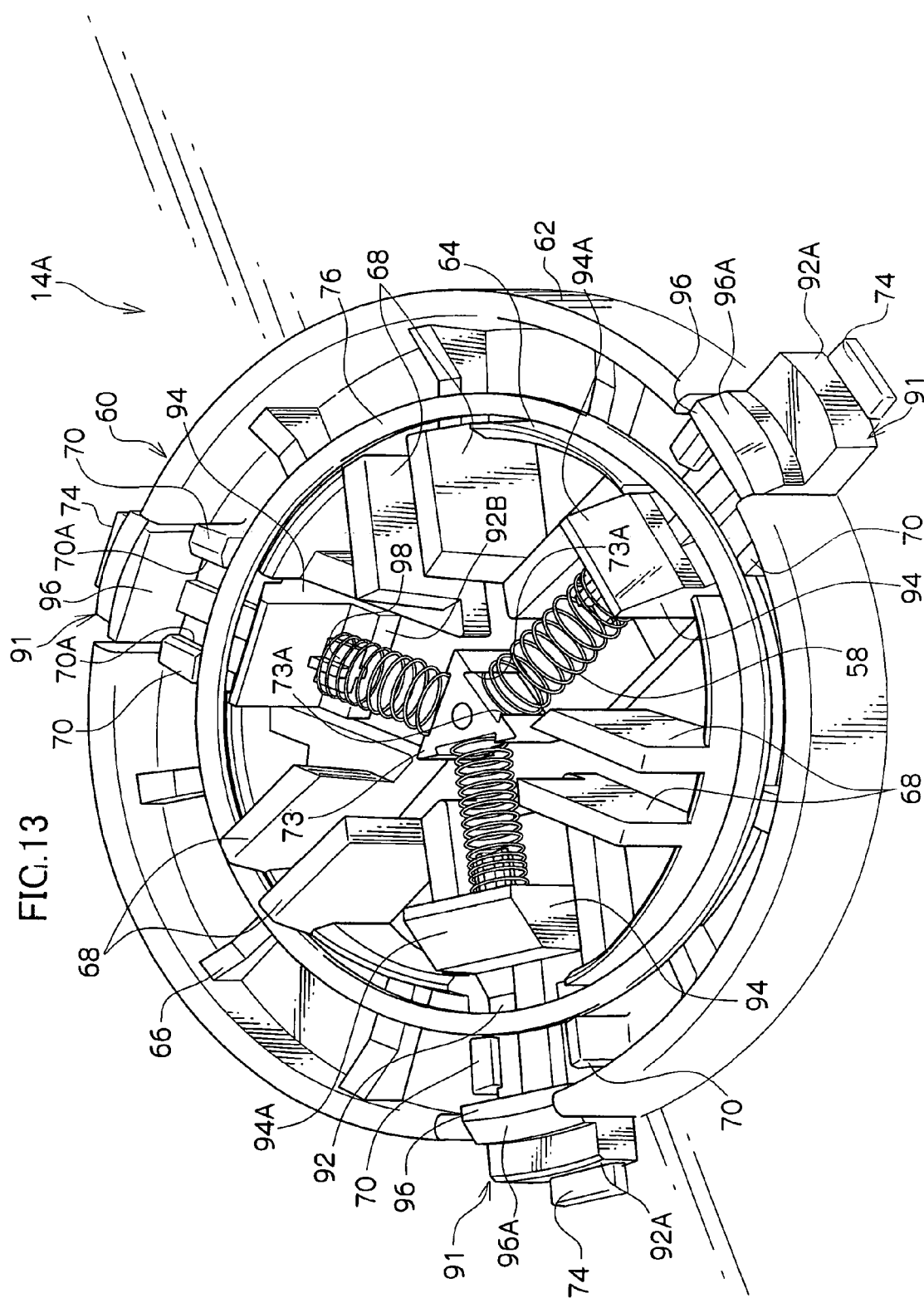
FIG. 13 is a perspective view showing the mounting portion provided in the upper case half.
Figure 14:
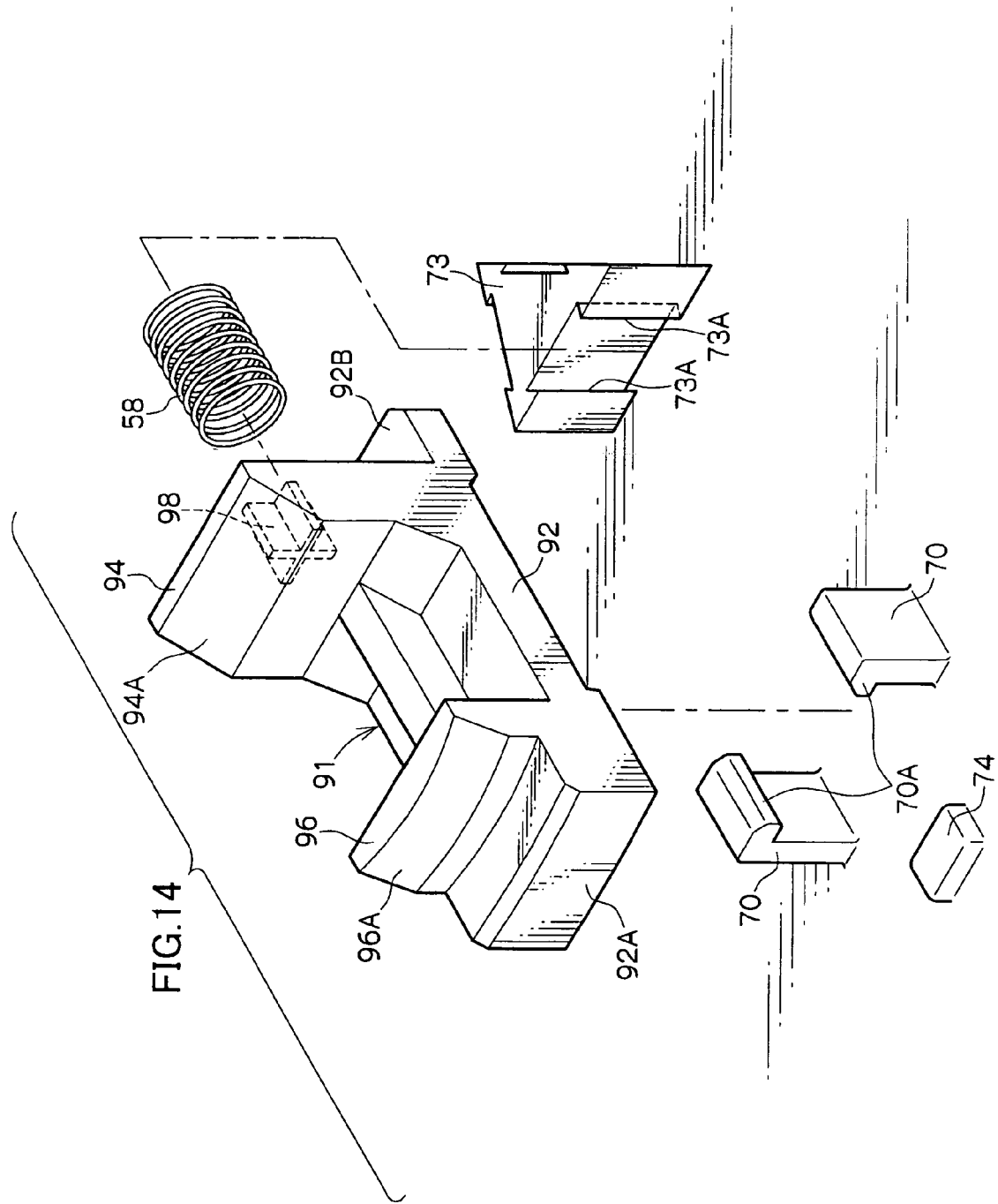
FIG. 14 is a perspective view showing a manner in which a lock member and a coil spring are incorporated.
Figure 15:
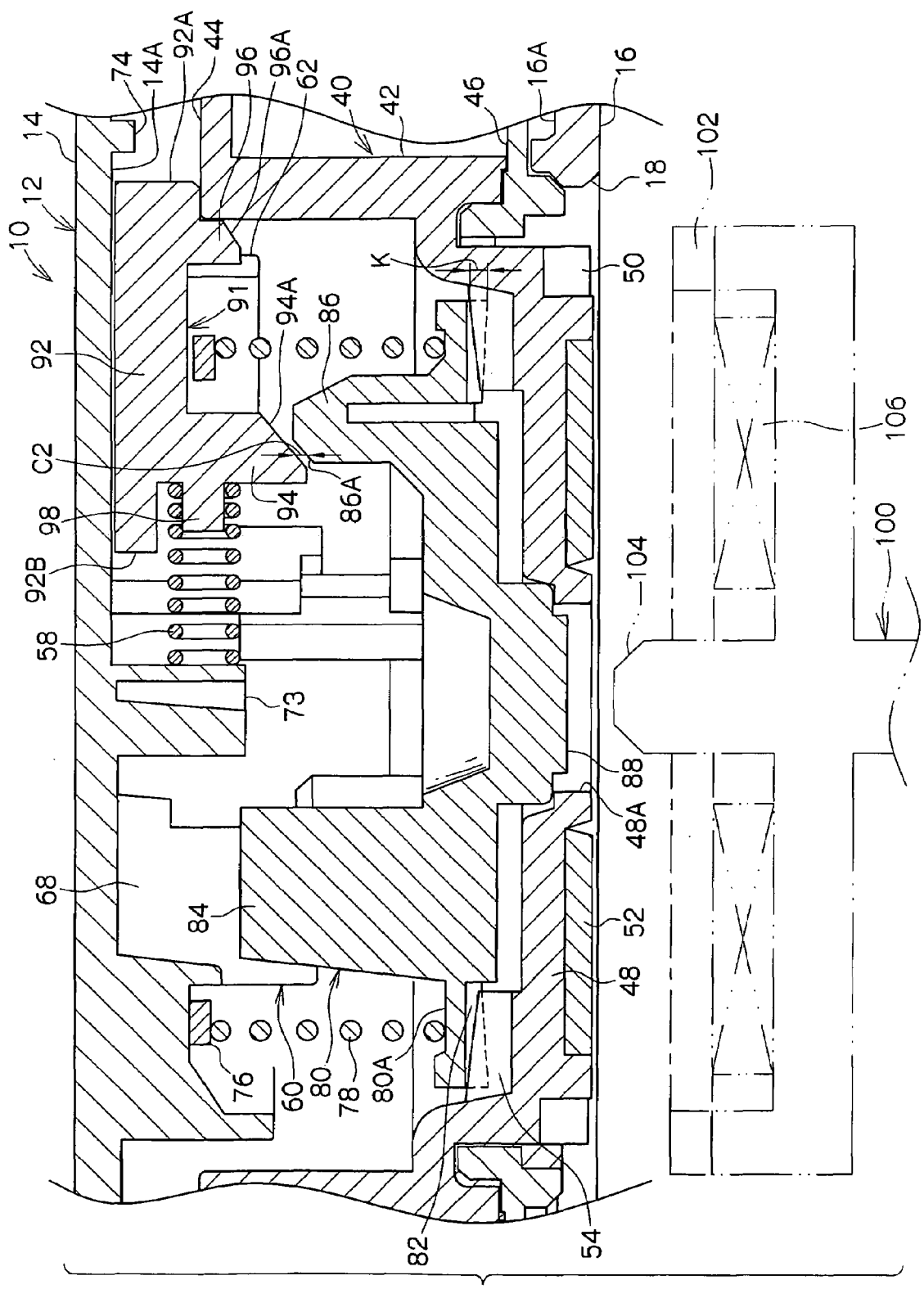
FIG. 15 is a fragmentary enlarged sectional side view showing the recording tape cartridge before a rotary shaft is moved up.

As shown in FIGS. 12 to 14, the lock member 91 which is used when the coil spring 58 is used is different from the lock member 90 in the following points: the lock member 91 has a cam portion 94 projectingly provided to extend vertically with respect to a body portion 92 (axially of the reel 40), and a stabilizing portion 92B is extended by a predetermined length radially inwardly of a cam portion 94 of the body portion 92.

Further, a fitting portion 98, which is cross-shaped as seen in a plan view and over which the coil spring 58 is fitted, is projectingly provided on a radially inside surface of the cam portion 94 in such a manner as to extend by a predetermined length radially inwardly. The outer diameter of the fitting portion 98 is made slightly greater than the inner diameter of the coil spring 58 so that the coil spring 58 is prevented from being removed from the fitting portion 98.

In the mounting portion 60, an retainer projection 73 for holding the coil spring 58, in lieu of the crimping pin 72, is projectingly provided at the center of the mounting portion 60. The retainer projection 73 is configured in a generally triangular prism-like shape so that it can hold the three coil springs 58 all together, and provided at the opposite edges of each side face with a pair of retainer claws 73A which are formed in such a manner as to inwardly project and extend along the full height of the retainer projection 73 and adapted to retain one end (one turn) of the coil spring 58 from the opposite sides.

Although it is preferred that a fitting portion 98 be provided on the retainer projection 73, difficulties will be encountered in an attempt to form such a fitting portion because of being undercut. Accordingly, by forming the pair of retainer claws 73A extending by the full height of the retainer projection 73, it is arranged that when the coil springs 58 and the lock members 91 are incorporated in place, the incorporation capability is enhanced, and that the coil springs 58 and the lock members 91 can be securely held between the retainer projection 73 and the support ribs 66.

In the case of the leaf spring 56, it could easily be mounted even after the stopper member 76 has been adhered onto the support ribs 66. However, in the case of the coil spring 58, it is difficult to mount them after the stopper member 76 has been adhered onto the support ribs 66, and therefore it is even more necessary that the lock members 91 be supported in a manner to prevent the lock members 91 from jumping out.

For this reason, not only the retainer portion 73 is provided with the retainer claws 73A, but also the body portion 92 is provided with a stabilizing portion 92B having a predetermined length (to be slightly longer than the fitting portion 98). With such an arrangement, the center of gravity of the lock member 91 can be set as low as possible so that the lock member 91 can be prevented from jumping out from the mounting portion 60 (accommodation portion 63) due to the tension of the coil spring 58, when the lock member 91 and the coil spring 58 are incorporated in the mounting portion and held between the retainer projection 73 and the stopper rib 74.

The operation of the recording tape cartridge using such coil springs 58 as mentioned will now be described. Since other parts than the coil springs 58 are similar to those in the embodiment described earlier, description thereof will be omitted.

The recording tape cartridge 10, when in non-use (when not loaded into the drive device), is arranged such that the reel 40 is downwardly biased via the brake member 80 with the aid of the compression coil spring 78. That is, the brake gear 82 of the brake member 80 is strongly meshed with the engagement gear 54 in the reel hub 42 due to a biasing force of the compression coil spring 78, thereby preventing the reel 40 from being inadvertently rotated.

Further, each lock member 91 is biased radially outwardly from the center of the mounting portion 60 (the center of the reel 40) due to a biasing force of the associated coil spring 58 so that the engagement portion 96 thereof is engaged with the upper edge portion of the reel hub 42. That is, the outside surface of the engagement portion 96 excluding the tapered surface 96A is pressed against the inner peripheral surface of the reel hub 42, and the end portion 92A radially outside the engagement portion 96 of the body portion 96 is interposed between the upper surface of the upper flange 44 and the inner surface of the top plate 14A (the lower surface of the end portion 92A is disposed either in surface contact or in minutely spaced opposing relationship with the upper surface of the top plate 14A).

Since the outside end portion 92A of each lock member 91 (body portion 92) is configured so as to have a thickness D substantially equal to the distance W between the upper surface of the upper flange 44 and the inner surface of the top plate 14A when the reel 40 is located at the lowermost position, the reel 40 is prevented from upward movement by the lock members 91. In this manner, the reel 40 is prevented from being moved upward the recording tape cartridge 10 is impacted due to dropping or the like.

Further, since the clearance C2 between the cam portion 94 of the lock member 91 and the engagement projection 86 of the brake member 80 is extremely small and smaller than the amount of meshing between the brake gear 82 and the engagement gear 54, the brake member 80 is not substantially moved upward even if the recording tape cartridge 10 is impacted due to dropping or the like. Thus, the brake gear 82 is prevented from being disengaged from the engagement gear 54, so that there occurs no trouble such as the brake member 80 being jammed while being in a tilted orientation (being on the point of falling). Accordingly, no adverse influence is applied to the recording tape cartridge 10.

When recording data onto the recording tape T of the recording tape cartridge 10 or reproducing data recorded on the recording tape T of the recording tape cartridge 10, the recording tape cartridge 10 is loaded into the loading slot (not shown) of the drive device. That is, the recording tape cartridge 10 is inserted from the front wall 12A side into the loading slot (not shown) of the drive device. Then, in response to the loading operation, the opening-closing member (not shown) of the drive device approaches relative to the right end portion of the door 30 (on the right hand side relative to the culcrum shaft 26) and is brought into contact therewith, thus pressing the engagement recess.

In response to the pressing of the right end portion of the door 30 by the opening-closing member, the door 30 is rotated about the fulcrum shaft 26 against a biasing force of the torsion spring 28 so that the opening 20 is opened. When the opening 20 is opened as a result of the door 30 being rotated, the draw-out member (not shown) of the drive device is made to approach from the left side wall 12B side to the opening 20 and engaged with the aperture 22A of the leader tape 22. Then, the draw-out member engaged with the aperture 22A is moved away from the opening 20 so that the leader tape 22 is drawn out of the case 12 and wound onto a take-up reel (not shown) of the drive device.

Figure 16:
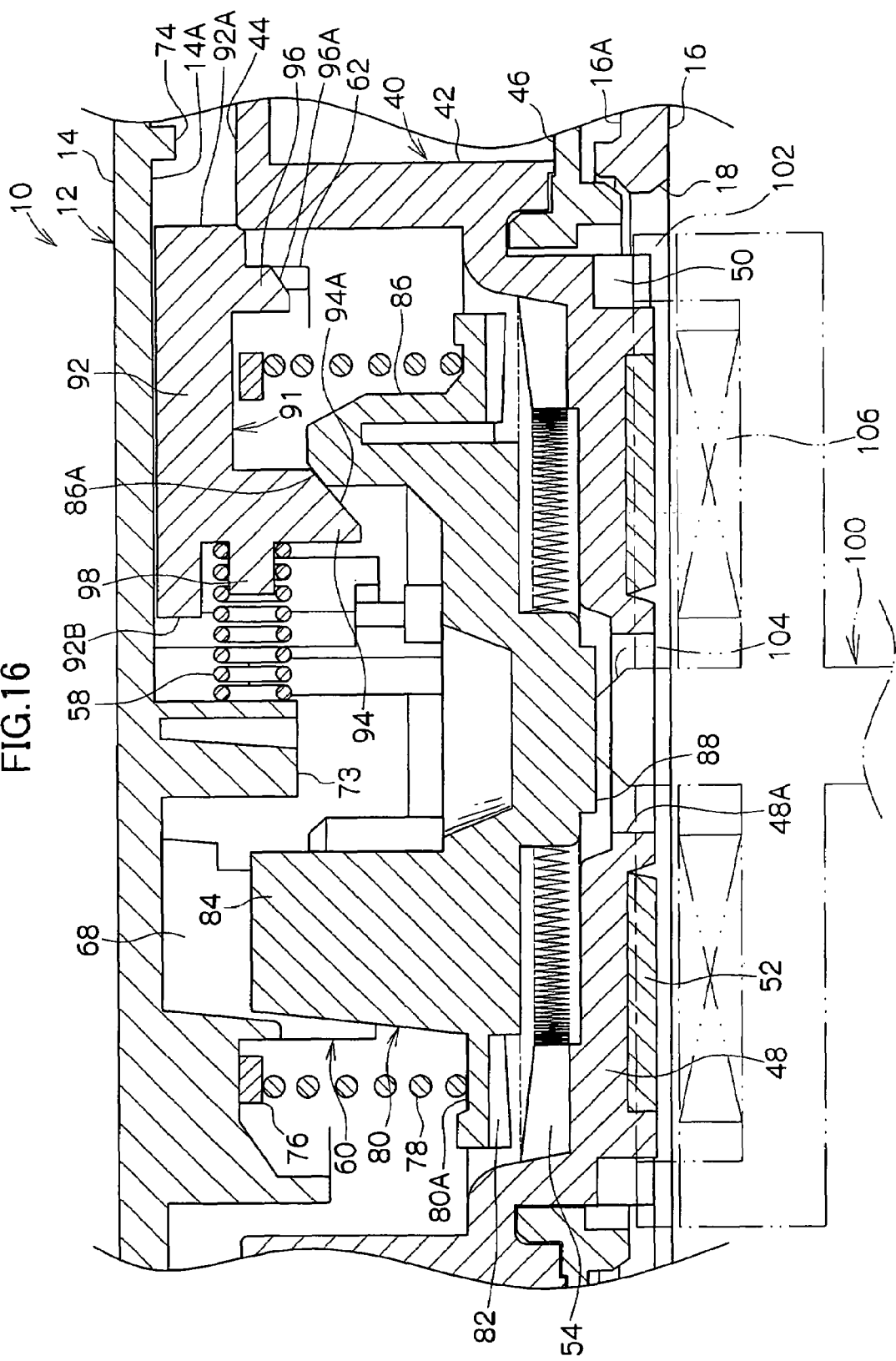
FIG. 16 is a fragmentary enlarged sectional side view showing the recording tape cartridge when the rotary shaft is being moved up.

Meanwhile, as shown in FIG. 16, the rotary shaft 100 of the drive device is caused to intrude into the gear opening 18 and approaches toward the bottom wall 48 of the reel 40. More specifically, the release projection 104 is pressed against the operation projection 88 thereby causing the brake member 80 to be moved upward. Consequently, the engagement gear 54 and the brake gear 82 are released from the meshing state, and prior to this, the engagement projection 86 is contacted with the cam portion 94 of the lock member 91 so that the cam portion 94 is further pressed upward.

As a result, the tapered surface 94A of the cam portion 94 is caused to slide on the tapered surface 86A of the engagement projection 86 so that each lock member 91 is caused to slide radially inwardly on the inner surface of the top plate 14A (in the accommodation portion 63) against a biasing force of the associated coil spring 58. At this point, the lock member 91 can slide with a low resistance by virtue of the fact that the body portion 92 is formed with the recess 92C. Further, the engagement portion 86 can appropriately engage the cam portion 94 since an angle in the range of 30-60 degrees (preferably of 45 degrees) is maintained between the tapered surfaces 86A and 94A which contact each other.

Furthermore, when the tapered surface 86A of the engagement projection 86 contacts and pushes up the tapered surface 94A of the cam portion 94, a torque that acts to cause the end portion 92A to be directed downward is imparted to the lock member 91. However, a reactive force against the torque can be produced by stabilizing portion 92B and the holding portions 70 (stopper member 76).

In other words, the torque can be accommodated because of the stabilizing portion 92B contacting the inner surface of the top plate 14A and because of the lock member 91 contacting the undercut portion 70A of the holding portion 70 (stopper member 76). Thus, lock member 91 is permitted to slide stably without being removed from the accommodation portion 63 (mounting portion 60).

As each lock member 91 is caused to slide radially inwardly in the accommodation portion 63, the outside surface of the engagement portion 96 of the lock member 91 is spaced apart from the inner peripheral surface of the reel hub 42 so that the outside end portion 92A of the body portion 92 is removed from between the upper surface of the upper flange 44 and the inner surface of the top plate 14A (the lower surface of the end portion 92A is spaced apart from the upper surface of the upper flange 44).

Figure 17:
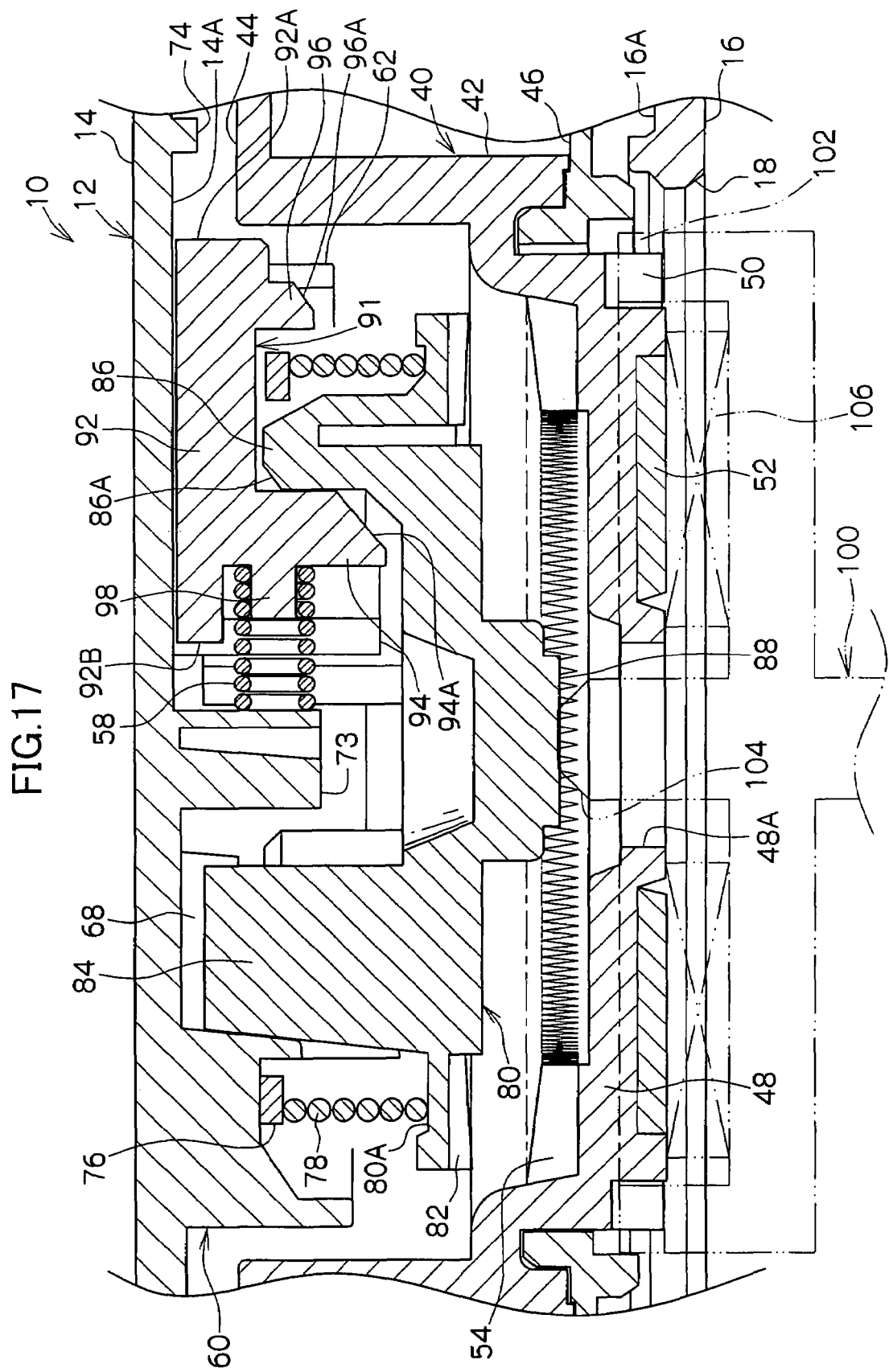
FIG. 17 is a fragmentary enlarged sectional side view showing the recording tape cartridge after the rotary shaft has been moved up.
Figure 18:
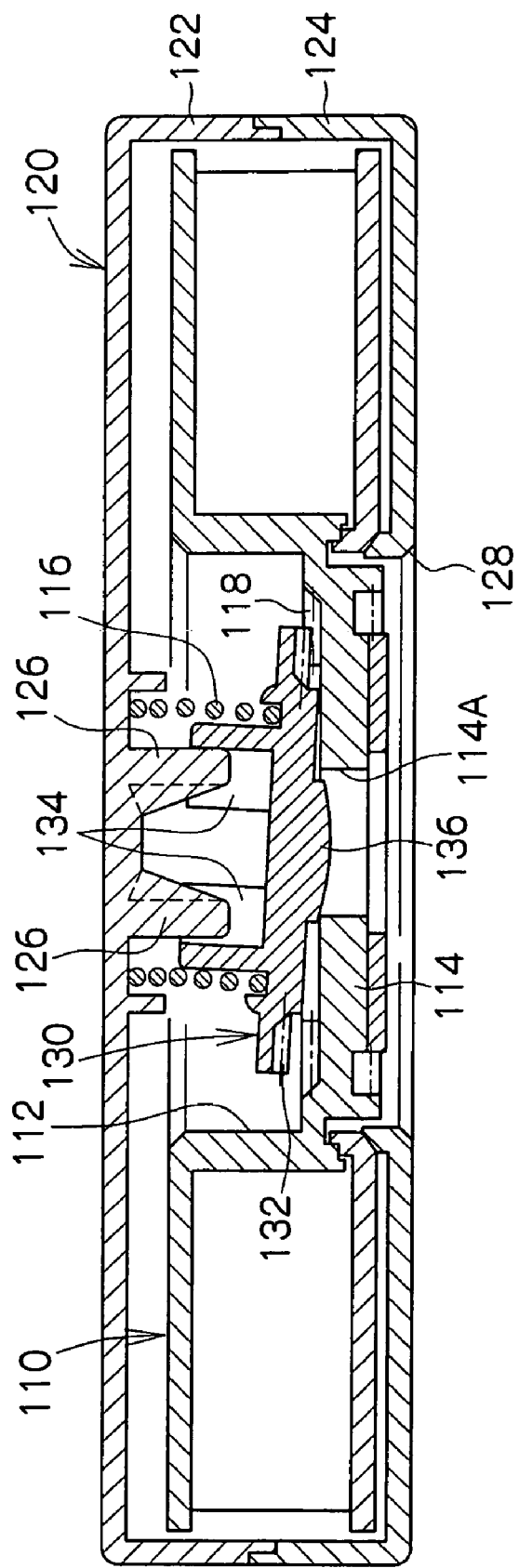
FIG. 18 is a sectional side view of a conventional recording tape cartridge.

Further, as shown in FIG. 17, the cam portion 94 is caused to intrude (drop) inside of the engagement projection 86, as a result of which the outside end portion 92A of the body portion 92 is located inside the reel hub 42, and the outside surface of the cam portion 94 is contacted with the inside surface of the engagement projection 86. Thus, the engagement of the engagement portion 96 with the upper edge portion of the reel hub 42 is released so that each lock member 91 is held in an unlocked state.

As the rotary shaft 100 is moved upward, the drive gear 102 is brought into meshing relationship with the reel gear 50, and the reel plate 52 is attracted to the magnet 106. When the drive gear 102 is meshed with the reel gear 50, the reel 40 is moved upward to reach a predetermined height and becomes rotatable within the case 12. Thus, the drive gear 102, or the reel 40 is driven to be rotated in synchronism with the take-up reel so that the recording tape T is transferred sequentially toward the drive device. Accordingly, recording of data onto the recording tape T or reproduction of data recorded on the recording tape T is performed by means of the recording/reproducing head of the drive device.

In an attempt to unload the recording tape cartridge 10 from the drive device, the drive gear 102 is first rotated in reverse, thereby rewinding the recording tape T onto the reel 40. The leader tape 22 is then removed from the take-up reel, and returned into the case 12 via the opening 20. That is, the protrusions 22B of the leader tape 22 are accommodated in the accommodation recesses 24 and held at a predetermined position within the case 12.

Subsequently, the rotary shaft 100 is moved downward so that the drive gear 102 is released from the meshing relationship with the reel gear 50 while at the same time the magnet 106 is spaced apart from the reel plate 52. The reel 40 is moved downward via the brake member 80 due to a biasing force of the compression coil spring 78. Thereupon, each lock member 91 is caused to slide radially outwardly within the accommodation portion 63 due to a biasing force of the coil spring 58 so that the tapered surface 94A of the cam portion 94 is caused to slide on the tapered surface 86A of the engagement projection 86. At this point too, each lock member 91 is enabled to slide stably while being prevented from being removed from the accommodation portion 63 (mounting portion 60) by means of the stopper means 76.

The engagement portion 96 is engaged with the upper edge portion of the reel hub 42 as a result of the engagement projection 86 being spaced apart from the cam portion 94. That is, the outside surface of the engagement portion 96 excluding the tapered surface 96A is pressed against the inner peripheral surface of the reel hub 42 due to a biasing force of the coil spring 58, and the outside end portion 92A of the body portion 92 is interposed between the upper surface of the upper flange 44 and the inner surface of the top plate 14A (the lower surface of the end portion 92A is disposed either in surface contact or in minutely spaced opposing relationship with the upper surface of the upper flange 44. In this way, the reel 40 is again placed in a state in which the reel 40 is prevented from being moved upward.

At this point, the brake gear 82 is strongly meshed with the engagement gear 54 so that inadvertent rotation of the reel 40 is prevented. Further, the rotary shaft 100 is removed from the gear opening 18, subsequently the recording tape cartridge 10 is ejected from the loading slot, and the opening-closing member is spaced apart from the right end portion of the door 30 as a result of the ejecting operation. Thereupon, the door 30 is rotated about the fulcrum shaft 26 in the direction opposite to the direction mentioned above due to a biasing force of the torsion spring 28, thus closing the opening 20. In this manner, the recording tape cartridge 10 has the opening 20 closed, and is ejected from the drive device.

Although in the above-mentioned embodiment, description has been made of the case where the leaf spring 56 and coil spring 58 are used as means for causing the lock members 90 and 91 to be biased from the center of the reel 40 (mounting portion 60) radially outwardly, it is to be understood that the biasing means is by no means limited thereto. It is also possible that the biasing means may comprise a torsion spring, for example.

Further, although in the above-mentioned embodiment, it is arranged that the lock members 90 and 91 are caused to slide radially due to engagement with the brake member 80, the arrangement for causing the lock members 90 and 91 to slide radially is not limited thereto. It is also possible that in addition to the brake member 80, a switching member or the like may be provided which is adapted to switch the lock members 90 and 91 between an up-down movement locking position (a position for preventing the reel 40 from being axially moved) and an up-down movement permitting position (a position for permitting the reel 40 to be axially moved), for example. However, in this case, it is preferable that the switching member or the like be arranged such that it is operated in interlocking relationship with the brake member 80.

While the present invention has been illustrated and described with respect to specific embodiments thereof, it is to be understood that the present invention is by no means limited thereto, and encompasses all changes and modifications which will become possible without departing from the scope of the appended claims.

What is claimed is:

1. A recording tape cartridge, comprising:
  a case for accommodating a reel on which a recording tape is wound;
  a brake member provided non-rotatably with respect to the case, the brake member being capable of being moved to selectively assume a rotation locking position where the brake member is disposed in engagement with the reel thereby preventing the reel from being rotated and a rotation permitting position where the brake member is disposed out of engagement with the reel thereby permitting the reel to be rotated;
  an engagement projection provided on the brake member, the engagement projection having a first tapered surface formed on an end portion thereof;
  a lock member provided in a mounting portion formed on an inner surface of a top plate of the case, the lock member being slidable in a radial direction of the reel, the lock member being arranged, when the brake member assumes the rotation locking position, to be interposed between an upper surface of the reel and the top plate of the case thereby preventing the reel from being moved axially, lock member being also arranged, when the brake member is moved to assume the rotation permitting position, to be removed from between the upper surface of the reel and the top plate of the case in interlocking relationship with the movement for the brake member to assume the rotation permitting position thereby permitting the reel to be moved axially;
  a cam portion provided on the lock member, the cam portion being engageable with the engagement projection and having a second tapered surface formed on an end thereof;
  a stabilizing portion provided on the lock member more inward than the cam portion in a radial direction of the reel,
  a falling-out preventing member for preventing the lock member from falling out from the mounting portion;
  wherein a clearance between the first tapered surface and the second tapered surface at the rotation locking position in a direction of the movement of the brake member is made shorter than a length of movement stroke of the brake member from the rotation locking position to the rotation permitting position;
  wherein a reactive force against a torque imparted to the lock member when the first tapered surface contacts the second tapered surface is produced by the stabilizing portion and the falling-out preventing member.

2. The recording tape cartridge according to claim 1 wherein an angle between the engagement projection and the second tapered surface of the cam portion is in a range from 30 degrees to 60 degrees.

3. The recording tape cartridge according to claim 1 further comprising:
  a first elastic member provided between the brake member and the mounting portion for permitting the brake member to selectively assume the rotation locking position and the rotation permitting position; and
  a second elastic member provided between the lock member and the mounting portion for permitting the lock member to slide in a radial direction of the reel in response to the movement of the brake member.

4. The recording tape cartridge according to claim 3 wherein the first elastic member comprises a compression coil spring.

5. The recording tape cartridge according to claim 4 wherein the compression coil spring is contacted at a first end with the falling-out preventing member and at a second end with the brake member.

6. The recording tape cartridge according to claim 3 wherein the second elastic member comprises a leaf spring.

7. The recording tape cartridge according to claim 6 wherein: the brake member includes an engagement projection; the lock member includes a cam portion engageable with the engagement projection; and the leaf spring is mounted substantially at a center of the mounting portion and contacted with a radially inner surface of the cam portion of the lock member.

8. The recording tape cartridge according to claim 7 wherein the leaf spring is attached to a crimping pin projectingly provided substantially at a center of the mounting portion.

9. The recording tape cartridge according to claim 7 wherein the inner surface of the cam portion is inclined at a predetermined angle thereby causing a biasing force of the leaf spring to be directed toward the top plate of the case.

10. The recording tape cartridge according to claim 7 wherein an outside surface of the cam portion and a contacting inside surface of the engagement projection are formed with a mold draft angle substantially equal to zero degrees.

11. The recording tape cartridge according to claim 3 wherein the second elastic member comprises a coil spring.

12. The recording tape cartridge according to claim 3 wherein the second elastic member comprises a plurality of coil springs.

13. The recording tape cartridge according to claim 11 wherein the coil spring is provided between a retainer projection provided substantially at a center of the mounting portion and a radially inside surface of a cam portion provided on the lock member.

14. The recording tape cartridge according to claim 13 wherein the coil spring is fitted over a fitting portion provided on a radially inside surface of the cam portion.

15. The recording tape cartridge according to claim 14 wherein the fitting portion is cross-shaped in section and has an outer diameter slightly larger than an inner diameter of the coil spring.

16. The recording tape cartridge according to claim 14 wherein the inside surface of the cam portion is provided with an end portion slightly longer than the fitting portion.

17. The recording tape cartridge according to claim 13 wherein the retainer projection includes a pair of inwardly projecting retainer claws for retaining one end of the coil spring from both sides.

18. A recording tape cartridge, comprising:
a case for accommodating a reel on which a recording tape is wound on a reel hub including an upper flange and a lower flange;
a brake member being provided non-rotatably with respect to the case, the brake member being capable of being moved to selectively assume a rotation locking position where the brake member is disposed in engagement with the reel thereby preventing the reel from being rotated and a rotation permitting position where the brake member is disposed out of engagement with the reel thereby permitting the reel to be rotated;
an engagement projection provided on the brake member, the engagement projection having a first tapered surface formed on an end portion thereof;
a lock member provided in a mounting portion formed on an inner surface of a top plate of the case, the lock member being slidable in a radial direction of the reel, the lock member being arranged, when the brake member assumes the rotation locking position, to be interposed between an upper surface of the reel and the top plate of the case thereby preventing the reel from being moved axially, the lock member being also arranged, when the brake member is moved to assume the rotation permitting position, to be removed from between the upper surface of the reel and the top plate of the case in interlocking relationship with the movement of the brake member to assume the rotation permitting position thereby permitting the reel to be moved axially;
a cam portion provided on the lock member, the cam portion being engageable with the engagement projection and having a second tapered surface formed on an end portion thereof;
a stabilizing portion provided on the lock member more inward than the cam portion in a radial direction of the reel;
a first elastic member provided between the brake member and the mounting portion for permitting the brake member to selectively assume the rotation locking position and the rotation permitting position;
a second elastic member provided between the lock member and the mounting portion for permitting the lock member to slide in a radial direction of the reel in response to the movement of the brake member, and
a falling-out preventing member for preventing the lock member from being removed from the mounting portion;
wherein a clearance between the first tapered surface and the second tapered surface at the rotation locking position in a direction of the movement of the brake member is made shorter than a length of movement stroke of the brake member from the rotation locking position to the rotation permitting position;
wherein a thickness of a portion of the lock member which is interposed between an upper surface of the reel and the top plate when the brake member assumes the rotation locking position is made substantially equal to a distance between the upper flange and the top plate; and
wherein a reactive force against a torque imparted to the lock member when the first tapered surface contacts the second tapered surface is produced by the stabilizing portion and the falling-out preventing member.

19. The recording tape cartridge according to claim 1 wherein a plurality of the lock members are provided.

20. The recording tape cartridge according to claim 18 wherein a plurality of the lock members are provided.

* * * * *